United States Patent
Rosen et al.

(10) Patent No.: US 9,726,479 B2
(45) Date of Patent: Aug. 8, 2017

(54) SYSTEM FOR DETERMINING THE POSITION, SPEED, OR TRAJECTORY OF A SPORTS OBJECT

(71) Applicant: S&R Sports, Inc., San Diego, CA (US)

(72) Inventors: Stephen D. Rosen, San Diego, CA (US); Norbert R. Seufert, San Diego, CA (US); Jorge Sanchez, San Diego, CA (US); Michael Fontana, San Diego, CA (US); Brian Ickler, Highland Ranch, CO (US)

(73) Assignee: ATHELYTIX, INC., San Diego, CA (US)

( * ) Notice: Subject to any disclaimer, the term of this patent is extended or adjusted under 35 U.S.C. 154(b) by 0 days.

(21) Appl. No.: 15/181,285

(22) Filed: Jun. 13, 2016

(65) Prior Publication Data
US 2016/0296797 A1    Oct. 13, 2016

Related U.S. Application Data

(63) Continuation of application No. PCT/US2014/071689, filed on Dec. 19, 2014.
(Continued)

(51) Int. Cl.
*G06M 7/00* (2006.01)
*G01B 11/255* (2006.01)
(Continued)

(52) U.S. Cl.
CPC ............ *G01B 11/255* (2013.01); *A63B 63/00* (2013.01); *G01B 11/14* (2013.01); *G09B 19/0038* (2013.01)

(58) Field of Classification Search
CPC .......... A63B 2220/805; A63B 69/3658; A63B 2024/0034; G01P 3/685; G01P 3/68
(Continued)

(56) References Cited

U.S. PATENT DOCUMENTS 3,727,069 A    4/1973   Crittenden, Jr. et al.
5,401,018 A *  3/1995   Kelly ................. A63B 69/0002
                                                         473/140
(Continued)

FOREIGN PATENT DOCUMENTS

WO    2015095802 A1    6/2015

OTHER PUBLICATIONS

International Search Report and Written Opinion for related International Application No. PCT/US2014/071689, mailed Mar. 24, 2015 in 13 pages.

*Primary Examiner* — Thanh Luu
(74) *Attorney, Agent, or Firm* — Procopio Cory Hargreaves and Savitch LLP; Jonathan Cheng; Pattric Rawlins

(57) ABSTRACT

Systems for determining motion characteristics of a sports object. In an embodiment, the system comprises a light grid structure and a processor. The light grid structure comprises a frame and light-source assemblies and photo-detector assemblies. Each of the light-source assemblies and photo-detector assemblies is mounted on the frame such that each light-source assembly is on an opposite side of the frame than a corresponding photo-detector assembly, and each light-source assembly emits a light beam which is detected by its corresponding photo-detector assembly. The processor receives data that is based on outputs of the photo-detector assemblies. The data indicates light beam(s) which have been interrupted. Based on the data, the processor determines motion characteristic(s) of an object which interrupted the light beam(s), including an angle of incidence.

18 Claims, 18 Drawing Sheets

Related U.S. Application Data

(60) Provisional application No. 61/919,782, filed on Dec. 22, 2013.

(51) Int. Cl.
    *A63B 63/00*     (2006.01)
    *G01B 11/14*     (2006.01)
    *G09B 19/00*     (2006.01)

(58) Field of Classification Search
    USPC ........................................................ 250/221
    See application file for complete search history.

(56) References Cited

U.S. PATENT DOCUMENTS

| | | | |
|---|---|---|---|
| 5,479,008 A | * | 12/1995 | Nishiyama ......... A63B 24/0021 |
| | | | 250/222.1 |
| 5,988,645 A | | 11/1999 | Downing |
| 2008/0020870 A1 | | 1/2008 | Tien |
| 2010/0027937 A1 | | 2/2010 | Juni |
| 2010/0048313 A1 | | 2/2010 | Mooney |

* cited by examiner

US 9,726,479 B2

SYSTEM FOR DETERMINING THE POSITION, SPEED, OR TRAJECTORY OF A SPORTS OBJECT

CROSS-REFERENCE TO RELATED APPLICATIONS

This application is a bypass continuation of International Patent App. No. PCT/US2014/071689, filed on Dec. 19, 2014, and titled "System for Determining the Position, Speed, or Trajectory of a Sports Object," which claims priority to U.S. Provisional Patent App. No. 61/919,782, filed on Dec. 22, 2013, and titled "Detection and Measurement System to Determine Location Speed and Trajectory of Sports Objects," the entireties of both which are hereby incorporated herein by reference.

This application is related to U.S. Provisional Patent App. No. 61/096,201, filed on Sep. 11, 2008, and titled "Position, Speed and Trajectory Sensing System for Spherical Projectiles," the entirety of which is hereby incorporated herein by reference.

BACKGROUND

Field of the Invention

The embodiments described herein are generally directed to the field of sports science, and, more particularly, to the detection and determination of the motion characteristics of an object (e.g., a ball) used in a sports activity for the purposes of measuring the performance of an athlete using the object (e.g., throwing or hitting the ball).

Description of the Related Art

The level of competition in sports has increased with the advent of new technologies, capable of measuring and enhancing performance, and increasing understanding of human physiology and nutrition. All levels of amateur, professional, and recreational sports have become much more competitive.

There are now a diverse set of systems used to measure performance levels during competition. Many use high-speed cameras and software to determine an athlete's movements and/or the location and motion of the instruments or objects used in sports activities. Other systems utilize touch sensitive sensors to mark when an athlete has reached a goal (e.g., in a race).

These high levels of competition along with increasing demand from spectators and fans have pushed sports organizations and leagues to incorporate new technologies, for example, to make necessary calls during games. At times, the outcome of a game may even rely on such systems.

However, conventional systems used to determine the speed and trajectory of sports objects (e.g., baseballs, footballs, golf balls, soccer balls, etc.) are expensive. Such systems are prohibitively expensive for training purposes or amateur events, and therefore, are only used during public competition in professional events. What is needed is a system that provides the diverse sports-performance information that is useful to professionals, but which is inexpensive enough to be used by amateurs and students.

SUMMARY

Accordingly, systems and methods are disclosed to measure motion characteristics of a moving object, such as a thrown or hit sports object.

In an embodiment, a system is disclosed. The system comprises: a light grid structure comprising a frame, a plurality of light-source assemblies, and a plurality of photo-detector assemblies, wherein each of the plurality of light-source assemblies and the plurality of photo-detector assemblies is mounted on the frame such that each one of the plurality of light-source assemblies is on an opposite side of the frame than a corresponding one of the plurality of photo-detector assemblies, and wherein each of the plurality of light-source assemblies emits a light beam which is detected by its corresponding photo-detector assembly; and at least one processor that receives data that is based on outputs of the plurality of photo-detector assemblies, wherein the data indicates two or more light beams which have been interrupted and a time duration over which each of the two or more light beams has been continuously interrupted, and, based on the data, determines one or more motion characteristics of an object which interrupted the two or more light beams, wherein the one or more motion characteristics comprise an angle of incidence calculated based on the time durations over which the two or more light beams had been continuously interrupted.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
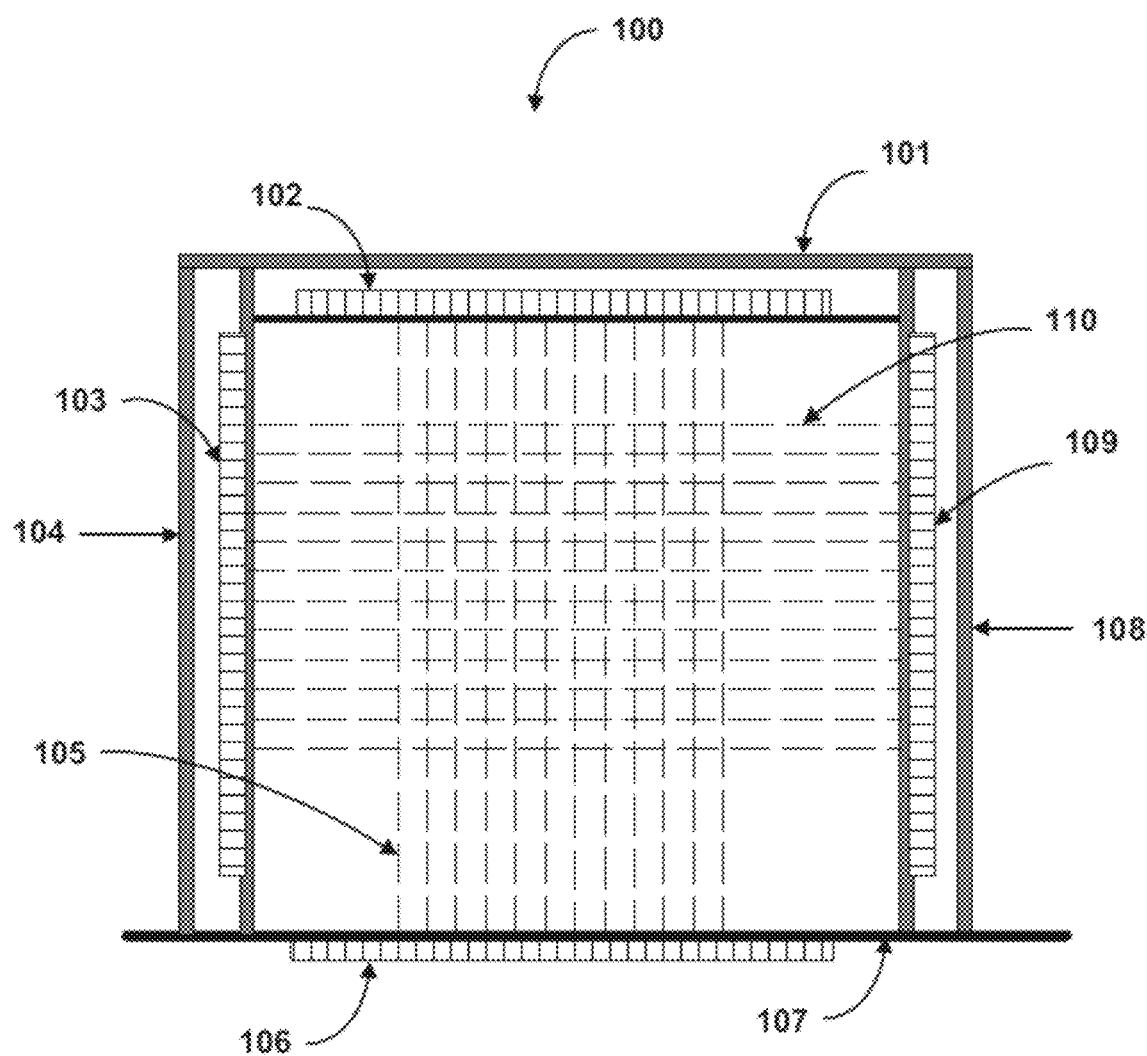
FIG. 1 illustrates a light grid structure which may be used to determine motion characteristics (e.g., location, speed, and/or trajectory) of an object, according to an embodiment.

In an embodiment, an apparatus is disclosed that comprises a distributed array of light sources and photo-detectors, arranged in a light grid, for detecting the presence of a sports object and measuring one or more motion characteristics of the sports object.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System

In an embodiment, the system comprises an apparatus comprising a distributed array of light sources and photo-detectors, arranged in a light grid, that are used to detect the presence of an object crossing the light grid. The apparatus may also comprise a set of distributed light-source drivers, a set of photo-detector amplifiers, and/or one or more threshold detectors and/or data serializers. In addition, the apparatus may comprise a communications link to a server, software used to implement the processes described elsewhere herein (e.g., to compute the location, trajectory, and speed of sports objects, perform statistical analysis, etc.), and/or a display to present information (e.g., the results a measurement or determination related to an object passing through the light grid).

It should be understood that, while examples may be described herein with respect to an object passing through the light grid in one direction, the apparatus may be configured to detect and measure characteristics of an object passing through the light grid in two directions (i.e., bi-directionally), including an object passing through the light grid sequentially in two directions. For example, the apparatus may be used to detect and measure characteristics of a sports object that sequentially crosses the light grid in two directions. The apparatus may be configured to detect a sports object that crosses the light grid at any angle of incidence greater than (or less than) zero degrees with respect to the plane of the grid. Alternatively, the apparatus may also be configured to detect a sports object that crosses the light grid at an angle of incidence equal to zero degrees with respect to the plane of the grid.

The light grid may be formed by a plurality of light beams arranged vertically in one plane and a plurality of light beams arranged horizontally in the same plane or in a different plane (e.g., a plane that is offset from the vertical plane in a horizontal direction). Alternatively, the light beams may be arranged in a crisscross pattern or other pattern using other than vertical or horizontal directions. While embodiments disclosed herein will primarily be described with respect to a grid pattern having light beams arranged vertically and horizontally, it should be understood that other patterns are possible (e.g., light beams arranged vertically, horizontally, and/or along one or more diagonals).

Each light beam may be formed by a light source on one end and a photo-detector on another end. Specifically, each light source is directed towards a corresponding photo-detector, capable of sensing the light from the light source, to form a light beam. A plurality of these corresponding pairs of light source and photo-detector are then arranged in an array to form the light grid. While the embodiments disclosed herein will primarily be described with respect to a one-to-one correspondence between light source and photo-detector, it should be understood that other arrangements are possible (e.g., a plurality of light sources corresponding to a single photo-detector capable of sensing multiple light beams, a single light source corresponding to a plurality of photo-detectors capable of sensing different portions of the light source, etc.).

The apparatus may comprise a window structure, formed by a frame in the shape of a square or rectangle, with an opening or window within the frame. However, it should be understood that other shapes are possible (e.g., hexagons, octagons, etc.). Each pair of light source and photo-detector may be mounted on the window structure, such that the light source is on an opposite side of the window structure as its corresponding photo-detector. In this manner, the light grid is formed within the opening of the window structure (in a manner akin to the strings of a tennis racquet). Thus, the light grid may be coplanar with the opening in the window structure.

In an embodiment, each of the plurality of beams of light in one or each direction (e.g., horizontal, vertical, etc.) are spaced equidistant from each other. This spacing may be set to smaller than the smallest dimension of the smallest object to be detected. For example, if the apparatus is designed to detect any type of ball, the spacing between adjacent light beams in each direction should be smaller than the smallest type of ball. For example, if the spacing is set to half the diameter of a golf ball, the apparatus would be able to detect anything wider than half the diameter of a golf ball, including a golf ball, baseball, soccer ball, football, and a human, assuming the opening of the window structure is large enough to accommodate all of these objects.

In an embodiment, the opening within the frame of the window structure is large enough to allow a human or humans and/or a sports object to pass freely through the opening, and thus, through the light grid formed in the opening. It should be understood that the size of the opening and light grid can be chosen to be larger or smaller depending on the particular design goals of the apparatus.

When an object (e.g., a human or a sports object, such as a ball) travels through the light grid (i.e., orthogonal to the plane or planes formed by the light grid), the object temporarily interrupts the light of one or more beams. Specifically, when the object is between a light source and its corresponding photo-detector, the photo-detector will no longer sense its corresponding light source. If the spacing between adjacent light beams is chosen to be smaller than the smallest object being detected, then such an object will interrupt at least two light beams in each direction. Thus, if the light grid is formed by two directions of beams (e.g., horizontal and vertical), the object will interrupt a minimum of four light beams.

When light from any of the light sources is interrupted, the corresponding photo-detectors react to their interruption, such that the output current signal from each of the corresponding photo-detectors decreases. In an embodiment, the output of each photo-detector is connected to a photo-detector amplifier. Thus, when the output current signal from a photo-detector decreases (e.g., below a predetermined threshold), the photo-detector amplifier changes an output state to indicate that the light beam for that photo-detector was interrupted. An individual photo-detector or a combination of a photo-detector with other components, such as the photo-detector amplifier, may both be referred to herein as a "photo-detector assembly." In an embodiment, each photo-detector assembly comprises a circuit board with both the photo-detector and other components (e.g., photo-detector amplifier) integrated into the circuit board.

In an embodiment, the apparatus comprises a set of distributed electronics which drive current locally through each light source. The light source may be a semiconductor laser diode or a light-emitting diode. Since the amount of light emitted by each light source depends on the amount of current through the light source, each light source may be controlled through an electronic driver to precisely set the amount of current through the light source. Each light source may be controlled by a corresponding light-source driver. An individual light source or a combination of a light source with other components, such as a light-source driver, may both be referred to herein as a "light-source assembly."

This distributed driver approach prevents the system from having to send current to each light source from a remote location. If a remote driver was used, wires may be required for each light source. For example, in an embodiment having one-hundred-ninety-two installed light sources, one-hundred-ninety-two pairs of wires would need to be routed through long distances that may be associated with the sports installation. However, using a local distributed electronic driver, only one pair of wires need be routed through the one-hundred-ninety-two sets of light-source assemblies in daisy-chain fashion, and the signals may be converted by the drivers from analog to digital signals locally at the light grid apparatus.

The reduction in the length of wires required by the distributed driver approach is particularly advantageous for other reasons as well. In embodiments in which the light source current is an analog signal, if the current had to travel through long wires, it would likely be corrupted by ambient electrical noise and power transients from nearby power lines. This could cause the light sources to have fluctuating currents, and therefore, a fluctuating amount of light output. In some cases, the power transients could reduce the life of the light sources, and thereby reduce the reliability of the pairs of light sources and photo-detectors to detect the desired objects.

In addition, each photo-detector produces a current in response to sensed light. In embodiments in which this current is an analog signal, the signal is typically on the order of microamperes. If such current was to be transmitted on long wires to an external system in order to determine performance (in contrast to being transmitted to a photo-detector amplifier integrated into the same circuit board as the photo-detector, as in embodiments disclosed herein), the system would likely require hundreds of wires routed from the photo-detectors to the external system. Again, these wires would be subject to ambient electrical noise, thereby increasing the probability of errors in readings, and in some cases decreasing the life span of the photo-detectors due to power transients.

In an embodiment, the apparatus comprises a data serializer which collects the output of each photo-detector assembly (i.e., indicating the state of the photo-detector assembly). The data serializer may sample each output at a predetermined sample rate (e.g., every N milliseconds). The data collected by the data serializer may be transmitted to an internal or external processing device via a communications interface (e.g., Ethernet). For example, the data serializer may transmit the data to a communication interface which transmits the data to a server in which the data is stored to a database. It should be understood that the communication interface may comprise a wired or wireless interface, a serial or parallel interface, etc.

The data serializer may sequentially sample the output states of the photo-detector assemblies according to a predetermined sampling rate, to determine which, if any, light beams have experienced an obstruction or interruption. If this sampling rate is not fast enough, then the interruption of a light beam (e.g., as indicated by the change in output state of a photo-detector) may be missed. Thus, this sampling rate should be set with consideration for the fastest object that the apparatus is desired to detect. For example, if the object to be detected is a hockey puck, the sampling rate should be set in view of the high speeds at which hockey pucks are known to travel. Specifically, the sampling rate should be fast enough that the hockey puck's obstruction of the light beams, as it passes through the light grid, is not missed, and such that sufficient samples can be taken as the hockey puck travels through the light grid to accurately determine the speed of the hockey puck.

Let S be the speed of the object to be detected as it travels through the light grid, and let D be the magnitude of the smallest dimension of the object to be detected projected onto an axis that is perpendicular to the plane(s) of the light grid. By the Newtonian equations of motion, the time T for the entire body of the object to travel through the light grid is $T=D/S$.

Let $F_s$ be the sampling rate needed to determine the state of all the outputs of the photo-detector assemblies of the apparatus. The sample time period $T_s$ is equal to the inverse of $F_s$, i.e., $T_s=1/F_s$. The time period $T_s$ (i.e., the time between samples of the entire set of photo-detector assembly outputs) should be significantly less than T, since the error in the grid-crossing time determination is directly related to the error in the speed and trajectory of the object to be detected. Thus, the sampling rate for the photo-detector assembly outputs is dependent on the size of the light grid, which in turn is dependent on the intended sports application, the number of light sources and photo-detectors, and the speed and size of the object to be detected.

In an embodiment, the data serializer samples all of the photo-detector assemblies sequentially. Alternatively, the data serializer may sample all of the photo-detector assemblies in parallel. In any case, the sampling rate for the photo-detector assemblies may be set fast enough to detect an obstruction of any of the light beams in the light grid, as well as fast enough to register multiple (e.g., several) samples of the obstruction(s) as the object travels through the light grid.

In an embodiment, the system comprises a server that receives and stores information related to the output states of the photo-detector assemblies (e.g., output states that indicate an obstruction of a light beam). The server may be local (e.g., part of or attached to the window structure of the apparatus) or remote (e.g., communicatively connected with the apparatus via a wired or wireless connection). The server may process the information and carry out mathematical operations to determine the speed and/or trajectory of objects detected based on obstruction states in the light grid. The server may automatically determine the speed and trajectory of an object whenever an object passes through the light grid in one direction, either direction, or in one direction and then in the other direction a short time afterwards (e.g., as determined by a time threshold). The server may also perform statistical operations.

In an embodiment, the server may be configured to render one or more graphical user interfaces for presenting any of the information received or the results of any operations or other processes (e.g., using text, graphs, images, videos, animations, inputs, etc.). For example, the server may comprise a web or application server capable of generating user interfaces in Hypertext Markup Language (HTML), eXtensible Markup Language (XML), or the like. Additionally or alternatively, the system may comprise a display, and the server may be configured to render user interfaces directly on the display (e.g., via a display driver). It should be understood that the user interfaces may comprise any of the conventional elements found in well-known user interfaces, such as images, videos, text, and/or inputs (e.g., textboxes, drop-down menus, radio buttons, checkboxes, links such as hyperlinks, etc.).

FIG. 1 illustrates a light grid structure 100, according to an embodiment. A window structure 101 comprises an opening in which the light grid is formed. Window structure 101 supports the equipment (e.g., light-source assemblies, photo-detector assemblies, processor(s), server(s), etc.) used to detect objects. In the illustrated example, window structure 101 comprises a left side 104, a right side 108, and a floor or base 107. However, it should be understood that, while window structure 101 is illustrated and described with three sides and a base, window structure 101 may comprise more (e.g., six, eight, etc.) or fewer (e.g., three sides and no base, two sides, etc.) sides and components than illustrated or described.

In an embodiment, an upper module 102 is mounted on the top of window structure 101 and comprises light-source assemblies (e.g., light emitters and associated electronics) for producing vertical light beams 105. A corresponding lower module 106 is mounted below base 107. The lower module 106 comprises the photo-detector assemblies (e.g., photo-detectors and associated electronics) for sensing the vertical light beams 105. It should be understood that upper module 102 and corresponding lower module 106 may be reversed, such that module 106 is affixed to the top of window structure 101 and module 102 is affixed to base 107, as long as there are corresponding light source assemblies and photo-detector assemblies on opposing sides of window structure 101 to create and sense vertical light beams 105.

In an embodiment, a left-side module 103 is mounted on left side 104 and comprises light-source assemblies (e.g., light emitters and associated electronics) for producing horizontal light beams 110. A corresponding right-side module 109 is mounted on right side 108 of window structure 101. The right-hand module 109 comprises the photo-detector assemblies (e.g., photo-detectors and associated electronics) for sensing the horizontal light beams 110. It should be understood that left-side module 103 and corresponding right-side module 109 may be reversed, such that module 103 is affixed to right side 108 of window structure 101 and module 109 is affixed to left side 104 of window structure 101, as long as there are corresponding light-source assemblies and photo-detector assemblies on opposing sides of window structure 101 to create and sense horizontal light beams 110.

It should also be understood that window structure 101 may comprise a different shape than a square or rectangle and a different number of sides than illustrated in FIG. 1. In embodiments which utilize a different shape (e.g., hexagon, octagon, etc.), window structure 101 can be configured such that each pair of opposing sides comprise light-source assemblies on one side and corresponding photo-detector assemblies on the opposing side. However, alternatively, each pair of opposing sides may comprise alternating light-source and photo-detector assemblies with alternating photo-detector assemblies and light-source assemblies on the opposing side, such that each light-source assembly corresponds to an opposing photo-detector assembly. In any case, it is sufficient that there are opposing and corresponding light-source and photo-detector assemblies, such that multiple light beams are generated and sensed in a grid-like pattern.

In an embodiment, structure 101 illustrated in FIG. 1 comprises various mechanical means to achieve positioning of the optoelectronic devices, hold the necessary electronics, and align the light-source and photo-detector assemblies. As illustrated, horizontal light beams 110 and vertical light beams 105 are at right angles (i.e., orthogonal) to each other. However, it should be understood that other patterns and angles are possible (e.g., diagonal light beams at 45° angles with respect to horizontal and/or vertical light beams, light beams at 30° angles with respect to another set of light beams, etc.).

In an embodiment, horizontal beams 110 are equally spaced with respect to each other and vertical light beams 105 are equally spaced with respect to each other. In addition, the spacing between horizontal beams 110 and the spacing between vertical beams 105 may also be equal to each other. The light sources and photo-detectors may be mounted using adjustable mechanical means to achieve the uniform spacing with the ability to adjust their positions and directions of operation. Furthermore, light beams 105 and 110 may be produced by the light sources in such a way that a set of collimated or parallel beams are obtained in each direction (e.g., horizontal and vertical).

In an embodiment, the light sources generate light beams that have a diameter small enough to obtain a specific level of precision in detecting the presence of an object in the light grid. The diameters of the light beams will depend on multiple factors such as the speed with which the object to be detected crosses the light grid, as well as the size of the object to be detected. In an embodiment, the diameters of the light beams may be modified or adjusted for a given application, so that the desired level of precision may be obtained.

Figure 2A:
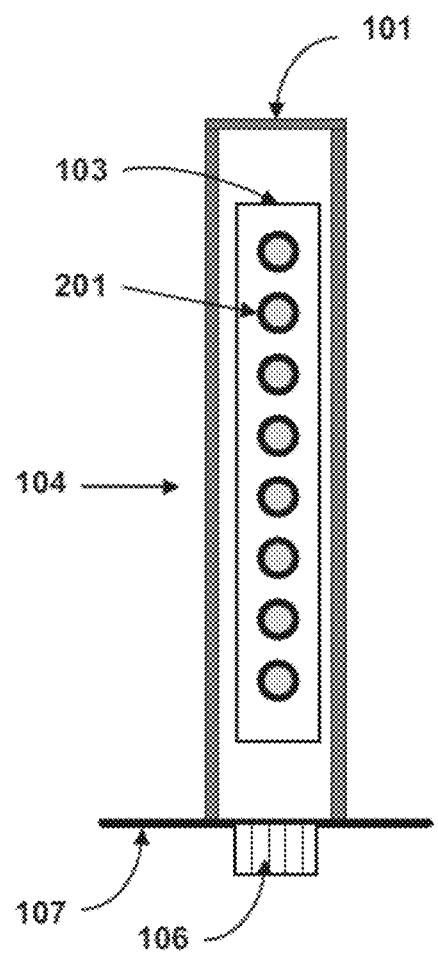
FIGS. 2A and 2B illustrate cross-sectional side views of the sides of the light grid structure in FIG. 1, according to an embodiment.
Figure 2B:
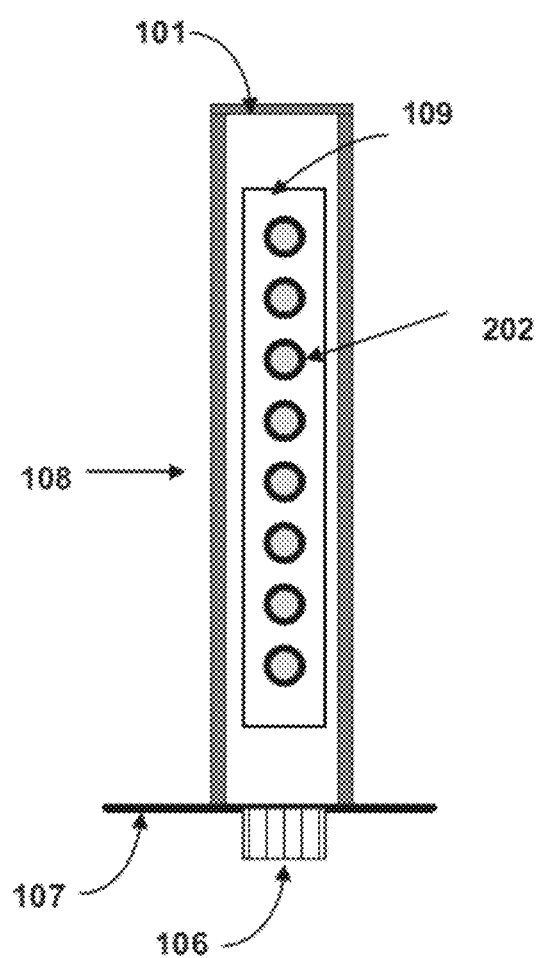

FIGS. 2A and 2B illustrate cross-sectional side views of the left side 104 and right side 108, respectively, of window structure 101 (i.e., within the plane of the light grid and the opening of window structure 101 looking towards sides 104 and 108, respectively), according to an embodiment. As illustrated in FIG. 2A, module 103 is mounted on the inside of window structure 101 (i.e., on an edge of the opening within window structure 101) and facing the opposite side (i.e., right side 108) of window structure 101. As shown, each light-source assembly 201 is equally spaced with respect to its adjacent light-source assembly(ies) within module 103 to produce collimated horizontal light beams 110. There can be K number of light-source assemblies 201 in module 103, depending on the size of the grid, where K is any arbitrary number large enough to achieve the desired detection precision for the size of the object to be detected.

As illustrated in FIG. 2B, module 109 is mounted on the inside of window structure 101 (i.e., on an edge of the opening within window structure 101) and facing the opposite side (i.e., left side 104) of window structure 101. As shown, each photo-detector assembly 202 is equally spaced with respect to its adjacent photo-detector assembly(ies) in module 109 to sense collimated horizontal light beams 110.

There can be K number of photo-detector assemblies 202 in module 109, corresponding to the K number of light-source assemblies 201 in module 103. Again, K can be any number large enough to achieve the desired detection precision for the size of the object to be detected. In addition, there may be various mechanical means in structure 100 for aligning the light sources of module 103 with the photo-detectors of module 109 (e.g., adjustable mounting brackets between window structure 101 and the light-source and/or photo-detector assemblies).

Figure 3A:
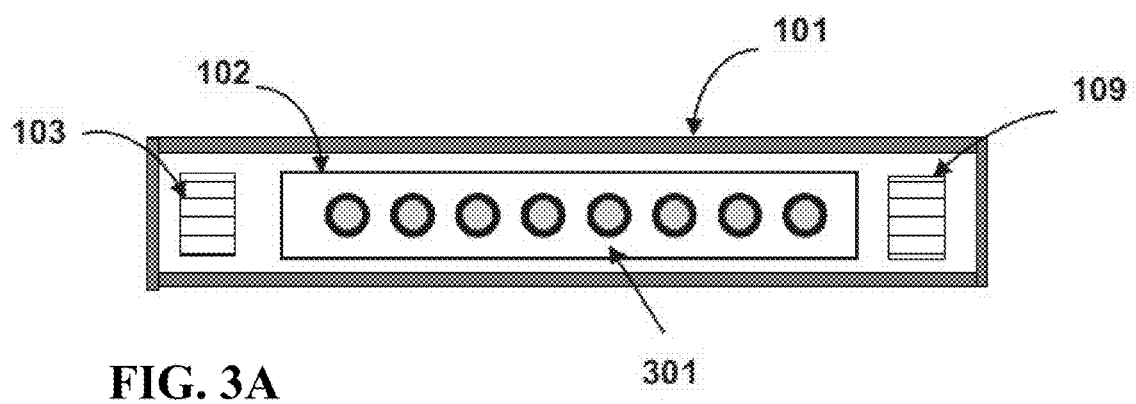
FIGS. 3A and 3B illustrate cross-sectional views of the top and bottom of the light grid structure in FIG. 1, according to an embodiment.
Figure 3B:
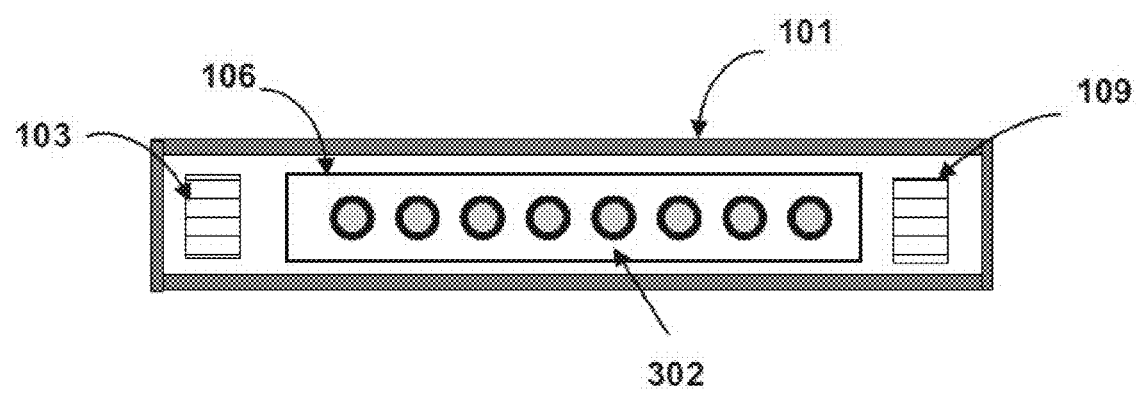

FIGS. 3A and 3B illustrate cross-sectional views of the top and bottom, respectively, of window structure 101 (i.e., within the plane of the light grid and the opening of window structure 101 looking towards the top and base 107, respectively), according to an embodiment. As illustrated in FIG. 3A, module 102 is mounted on the inside of window structure 101 (i.e., on an edge of the opening within window structure 101) and facing the opposite side (i.e., base 107) of window structure 101. As shown, each light-source assembly 301 is equally spaced with respect to its adjacent light-source assembly(ies) within module 102 to produce vertical collimated beams 105. There can be R number of light-source assemblies 301 in module 103, depending on the size of the grid, where R is any arbitrary number large enough to achieve the desired detection precision for the size of the object to be detected. R may be less than, equal to, or greater than K.

As illustrated in FIG. 3B, module 106 is mounted on the inside of window structure 101 (i.e., on an edge of the opening within window structure 101) and facing the opposite side (i.e., the top side) of window structure 101. As shown, each photo-detector assembly 202 is equally spaced with respect to its adjacent photo-detector assembly(ies) in module 109 to sense collimated vertical light beams 105. There can be R number of photo-detector assemblies 302 in module 106, corresponding to the R number of light-source assemblies 301 in module 102. Again, R can be any number large enough to achieve the desired detection precision for the size of the object to be detected. In addition, as discussed elsewhere herein, there may be various mechanical means in structure 100 for aligning the light-source assemblies of module 102 with the photo-detector assemblies of module 106 (e.g., adjustable mounting brackets between window structure 101 and the light-source and/or photo-detector assemblies).

Figure 4:
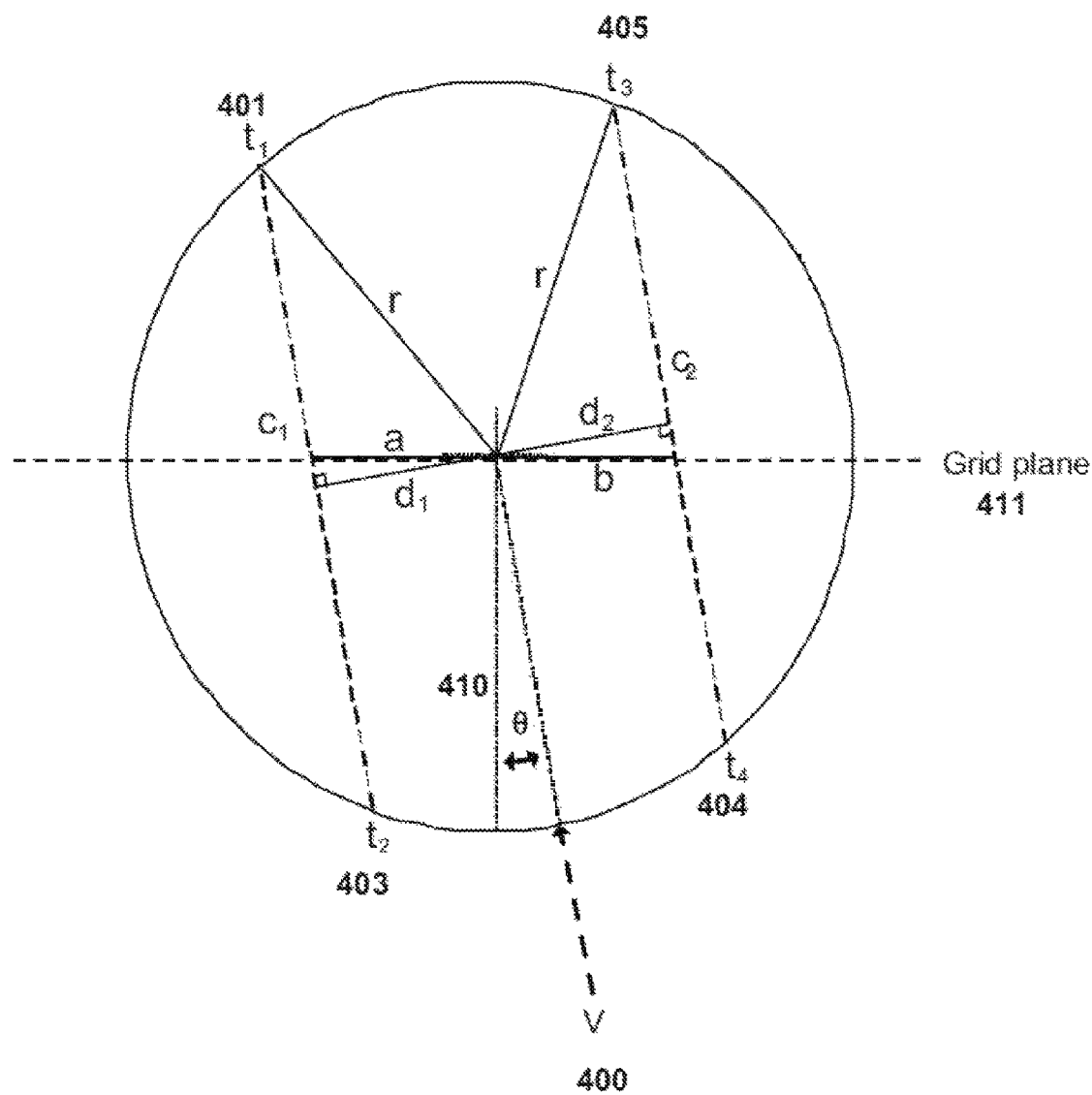
FIG. 4 illustrates an approach for detecting the location, speed, and trajectory of a ball passing through a light grid, according to an embodiment.

FIG. 4 illustrates an approach for detecting a ball (e.g., a baseball), according to an embodiment. This example only illustrates a pair of vertical beams, such as those illustrated as vertical beams 105, located towards the left and right sides of a ball passing through the plane 411 of the light grid. In other words, FIG. 4 illustrates a perspective of looking down on the ball as it passes through grid plane 411. The ball is traveling in a diagonal vector 400 at an angle theta 410 with respect to an axis that is perpendicular to vertical plane 411 of the light grid. As the ball passes through grid plane 411, the ball first breaks the left side vertical beam at location 401 of the ball at time t1. Subsequently, the ball ceases to block the left side vertical beam at location 403 of the ball at time t2. Similarly, as the ball passes through grid plane 411, the ball first breaks the right side vertical beam at location 405 of the ball at time t3. Subsequently, the ball ceases to block the right side vertical beam at location 404 of the ball at time t4. In an embodiment, a detection process (e.g., hardware and/or software executed by a processor of a server or other processing device local or remote to structure 101) calculates the time difference between t1 and t2 and the time difference between t3 and t4. These time differences can be used to determine the position, velocity, and angle of incidence of the ball as it passes through grid plane 411, as described in more detail elsewhere herein.

FIG. 4 only illustrates the detection of a ball using vertical light beams 105. There can be an additional set of time differences obtained using horizontal light beams 110. This additional set of time differences can also be used to determine the position, velocity, and angle of incidence of the ball (i.e., speed and direction) as it passes through grid plane 411.

As described elsewhere herein, in an embodiment, the detection process uses the time differences (t2-t1, t4-t3, etc.) and the dimensions of the ball (e.g., of a baseball) to calculate the speed or velocity of the ball. The detection process may be executed regardless of the initial direction of the object passing through the grid plane 411, and may be configured to calculate the speed and trajectory of an object at a location relatively distant from grid plane 411, as well as at grid plane 411. In an embodiment, the detection process may implement one or more user interfaces to display the physical location of an object against an image of a playing environment (e.g., baseball against a baseball field, football against a football field, golf ball against a golf course, etc.), as the object initially crosses grid plane 411 in one direction and/or returns through grid plane 411 in the opposite direction.

Figure 5:
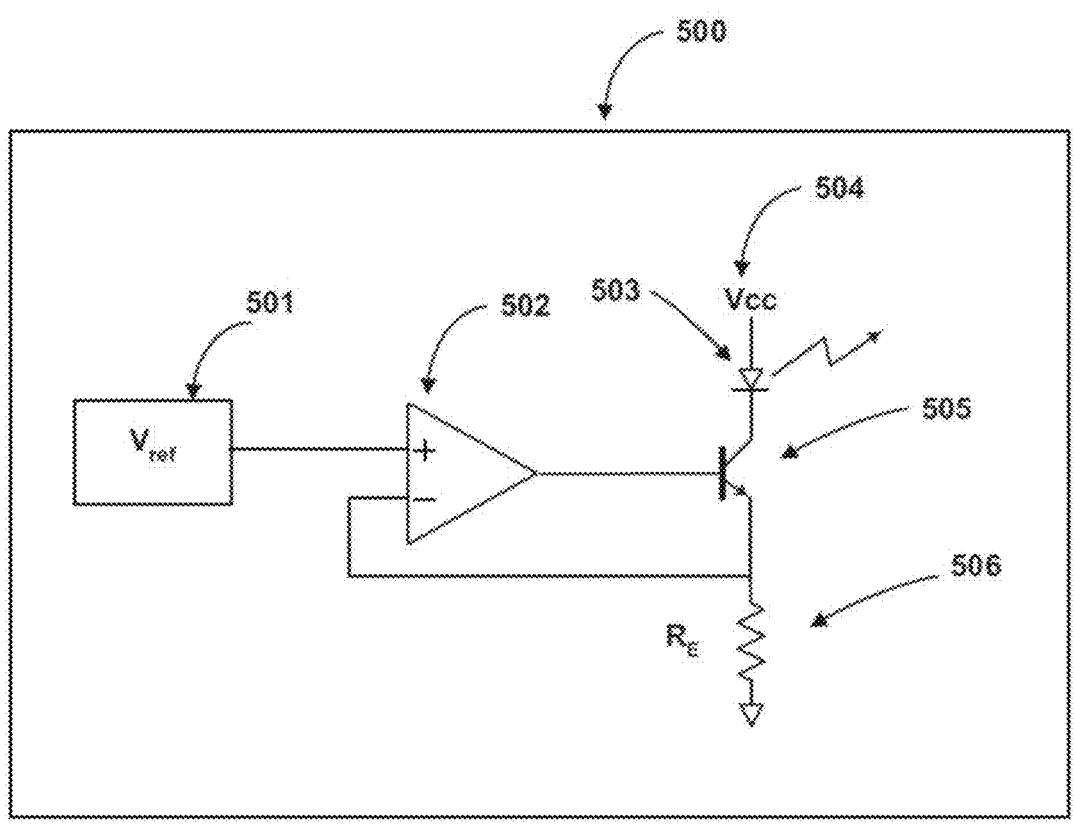
FIG. 5 illustrates a light source assembly used to form a laser light beam, according to an embodiment.

FIG. 5 illustrates a light-source assembly 500 (e.g., for generating a laser beam), according to an embodiment. Assembly 500 comprises a reference voltage 501, which is used to provide a stable voltage for setting a continuous laser current. The output voltage of reference 501 drives the current source that drives the current from the laser or other light emitter.

In an embodiment, the current source comprises an operational amplifier 502, transistor 505, and emitter resister $R_E$ 506. In the illustrated circuit arrangement, the current across resistor 506 is determined by the ratio of the output of reference voltage 501 to the value of resistor 506. The current across resistor 506 is the current from the emitter of transistor 505. The collector current of transistor 505 is the large signal current gain $\beta$ of the collector current $I_C$ of the emitter current $I_E$. In this case, $I_C=\beta \times I_E$. The collector current is the same as the current through semiconductor laser diode 503. Power supply voltage VCC 504 provides current for laser diode 503. Circuit 500 may also contain additional electronic circuits to compensate for manufacturing variations, aging, and/or ambient temperature changes in laser diode 503, which can substantially affect the laser output power and the ability of a corresponding photo-detector to reliably determine the presence of absence of the laser beam generated by circuit 500. Similar circuits can be used for embodiments that utilize a light-emitting diode (LED), instead of a laser.

Figure 6:
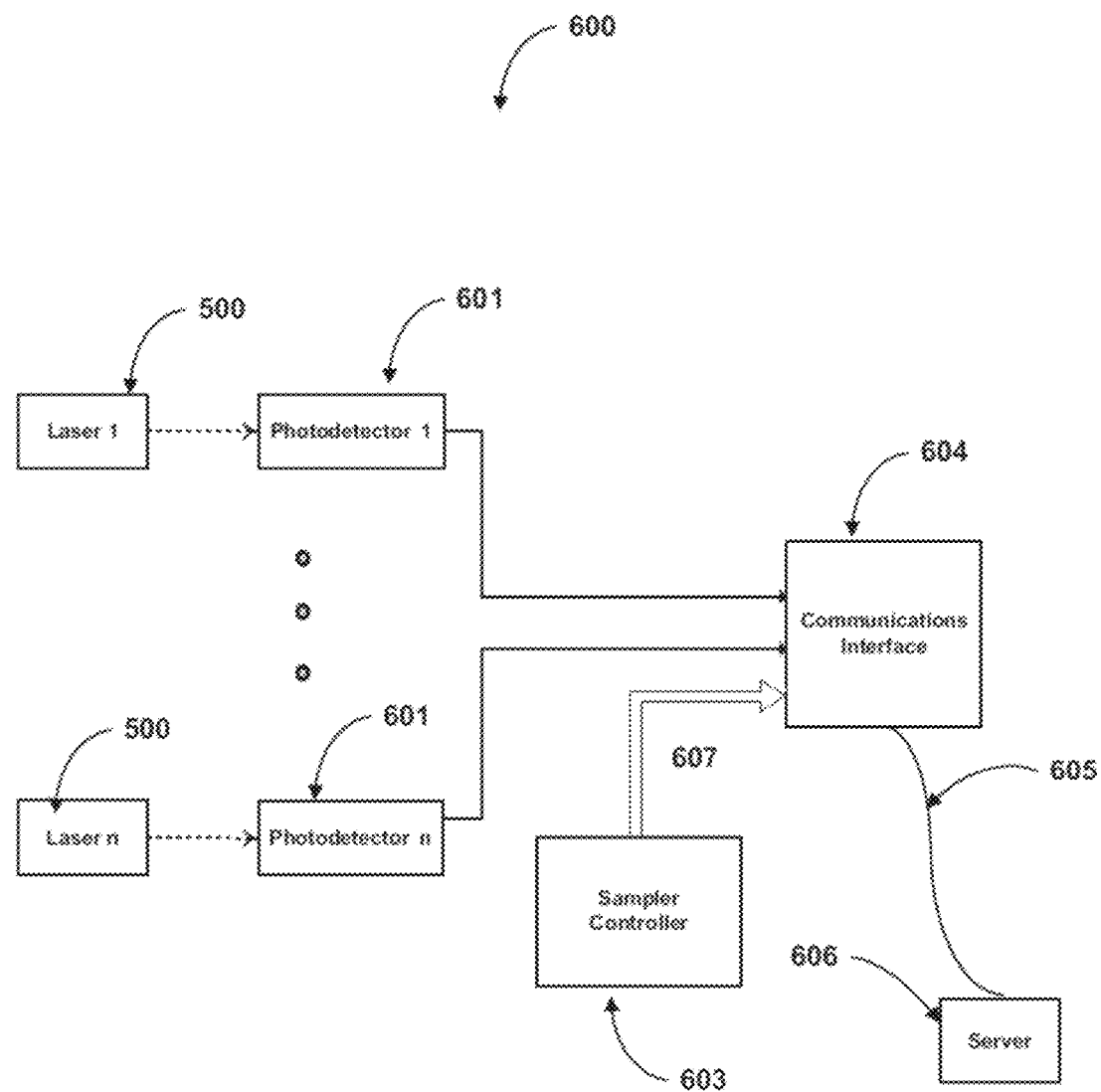
FIG. 6 illustrates a grid detection system that uses a sampling topology, according to an embodiment.

FIG. 6 illustrates a grid detection system 600 that uses a sampling topology, according to an embodiment. A set of laser light-source assemblies (or other type of light-source assemblies, e.g., LED light sources) 500 produce a total of N beams (e.g., vertical and horizontal beams 105 and 110, shown in FIG. 1), which are sensed or detected by a corresponding set of N photo-detector assemblies 601. It should be understood that each of the light-source assemblies 500 may be identical to each other, each of the photo-detector assemblies 601 may be identical to each other, and/or each of the light beams generated by the light-source assemblies 500 and detected by photo-detector assemblies 601 may be identical (e.g., in terms of power, diameter, etc.) to each of the other light beams.

In an embodiment, each photo-detector assembly 601 comprises a photo-detector diode device, which produces current in respond to laser light, and a current-to-voltage amplifier. In the sampling topology, all of the photo-detector outputs may be sequentially sampled by communications interface 604. Sample controller 603 continuously manages the sending or serial output from each photo-detector assembly to communications interface 604. This may be done by means of a set of select signals 607 sent from sample controller 603 to communications interface 604.

In an embodiment, communications interface 604 assembles a serial digital word with information that indications which beam(s) have been blocked or interrupted. Communications interface 604 may use an appropriate communication protocol, such as Ethernet, and a compatible Ethernet cable 605 or wireless connection to send the assembled word to a server 606. Server 606 may store the received word in a database, for example, for analysis.

In the illustrated topology, detection system 600 should operate at a sampling rate that is fast enough to detect the interruption of any of the laser beams by an object, such that times—e.g., t1, t2, t3, and t4, illustrated in FIG. 4—may be determined with an accuracy that is sufficient to calculate the speed and direction of the object.

Figure 7:
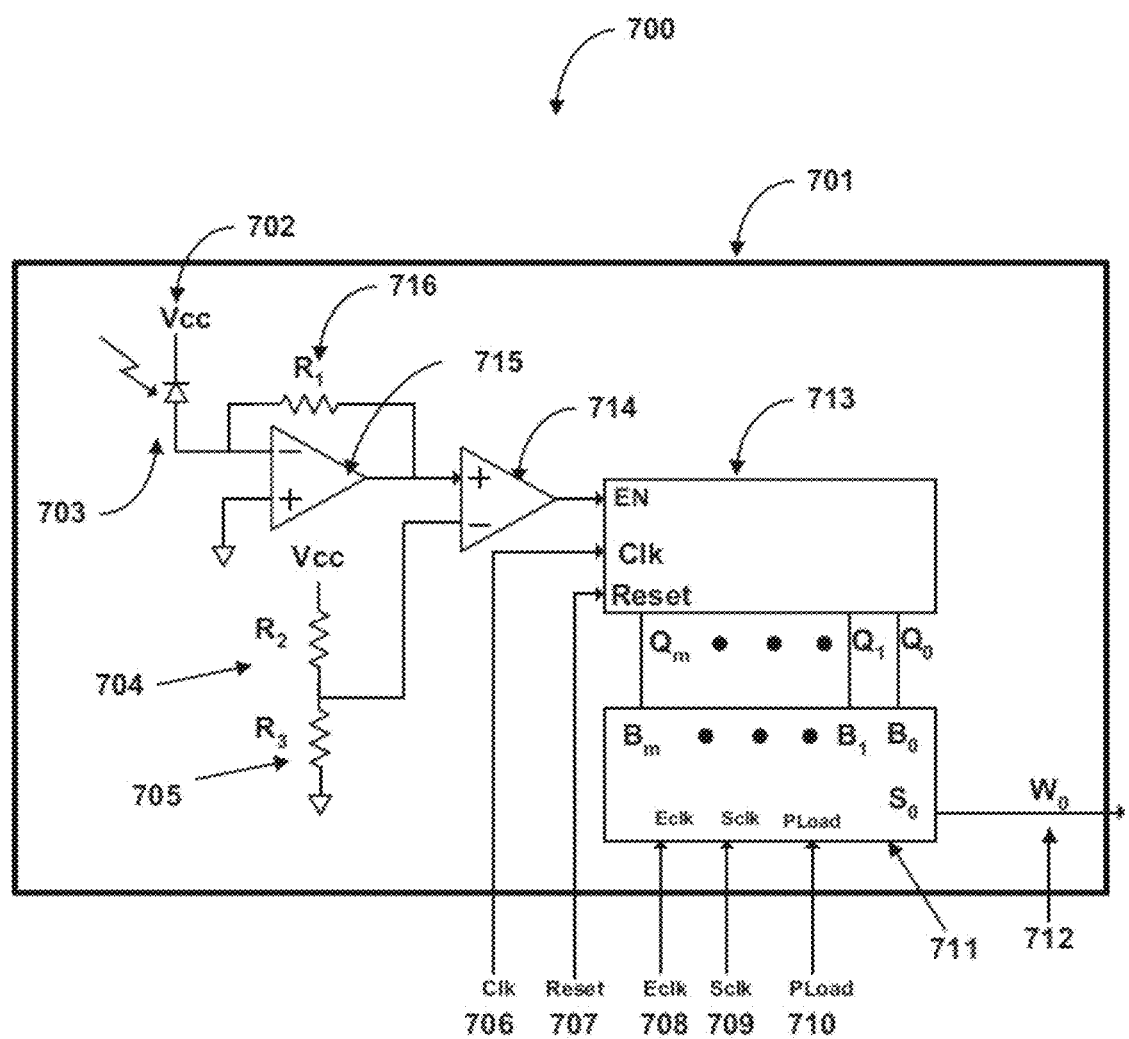
FIG. 7 illustrates a photo-detector assembly (e.g., for high-performance applications), according to an embodiment.

FIG. 7 illustrates an electronic photo-detector module or assembly 700, according to an embodiment. Photo-detector assembly 700 can be used for relatively fast applications that require high accuracy (e.g., when the object to be detected may be traveling at relatively high speeds). In this case, the system is not required to sample the entire set of photo-detector assemblies in order to achieve the desired accuracy (e.g., as may be required by the detection system 600). Instead, the system can rely on the speed of a set of detection electronics used in conjunction with each photo-detector assembly. The detection electronics may comprise a series of analog and digital circuits integrated on a single circuit board embodying each photo-detector assembly. For each time that a light beam is interrupted, a counter or timer in the respective detection electronics measures the amount of time that the beam is interrupted.

In an embodiment, photo-detector assembly 700 comprises a photo-detector 703, which receives light from the light beam (e.g., laser beam) generated by the corresponding light source. Photo-detector 703 is connected in a reverse bias direction with a power supply voltage 702 connected to its cathode. The output current of the photodiode is first converted to a voltage using a trans-impedance amplifier 715. Amplifier 715 uses resister 716 to convert the current into a voltage and which may scale the value. The output of amplifier 715 is fed to a comparator 714 that digitizes the state of the light beam. Resistors R2 704 and R3 705 form a voltage divider to set up a voltage threshold which determines when a light beam has been blocked or interrupted by an object.

When the light beam is not interrupted, the output of amplifier 715 is at a low voltage state due to its inverted configuration. This output is fed to the plus input of comparator 714. Since the negative input of comparator 714 (i.e., from the voltage divider) has a greater voltage value, the output of comparator 714 is a logic low voltage, which disables the EN input of counter 713.

When the light beam is interrupted, the current in the photodiode is reduced to only a negligible amount of leakage current. Thus, the output of amplifier 715 becomes a voltage higher than the voltage of the voltage divider, and comparator 714 switches state to a logic high voltage, which enables the EN input of counter 713.

In an embodiment, counter 713 is a binary counter. During operation, counter 713 starts with a count of zero. Thus, the binary word <Qm . . . Q0> is zero. When counter 713 is enabled by the output of comparator 714 to the EN input—thereby indicating an interruption of the light beam—the binary count output of counter 713 increases every time there is a rising edge of system clock 706. Subsequently, when the interruption of the light beam ends, the output of comparator 714 changes state and EN goes low, thereby stopping counter 713. Counter 713 outputs the binary count <Qm . . . Q0>, which represents the amount of time that the corresponding light beam was interrupted. If the frequency of clock 706, applied to counter 713, is F, then the inverse of this quantity is the time period T. Given a binary count output of <COUNT>, the corresponding amount of time the particular light beam was blocked is equal to COUNT×T. The output of counter 713 is loaded into inputs <Bm . . . B0> of shift register 711.

In an embodiment, the function of shift register 711 is to convert the binary count word <Qm . . . Q0> into a serial format. At the beginning of each detection period for an object, the output <Qm . . . Q0> of counter 713 is set to a COUNT of zero by control signal reset 707. Furthermore, at the end of each detection period, shift register 711 is first loaded with the COUNT by activation of Pload 710. The output WO 712 of shift register 711 is enabled by activation of Eclk 708. Thereafter, the COUNT is converted to a serial format by application of the serial clock Sclk 709. Each time there is a rising edge of clock Sclk 709, a bit of the word COUNT appears at the output WO 712 of shift register 711.

In an embodiment, in order to scale photo-detector assembly 701 so that it performs at very high accuracy to detect very high-speed objects, counter 713 and shift register 711 are designed with M bits, which is as large as needed, and the frequency of system clock Clk 706 is increased. For extremely high-speed applications, some or all of the electronic devices in photo-detector module 701, including amplifier 715 and comparator 714, can utilize a semiconductor technology that operates at very high speeds. Similarly, shift register 711 and counter 713 can be made with a logic technology that operates at very high speeds for system clock Clk 716.

Figure 8:
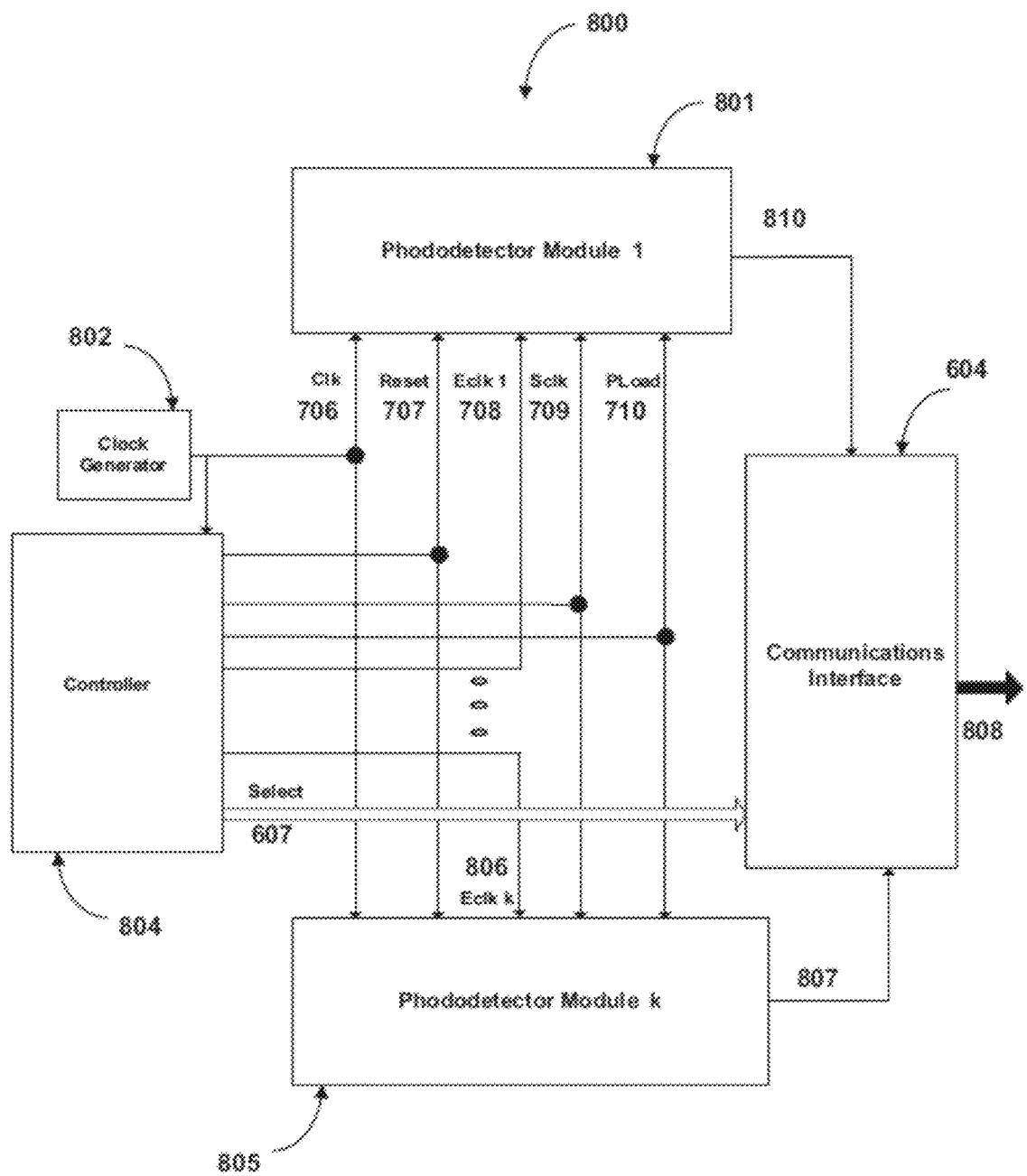
FIG. 8 illustrates detection electronics, according to an embodiment.

FIG. 8 illustrates a set of detection electronics 800 for high-speed, high-accuracy applications, according to an embodiment. In an embodiment of a grid detection system, there are K photo-detector assemblies (e.g., K photo-detector assemblies 700). The plurality of photo-detector assemblies represented by photo-detector module 1 801 to photo-detector module K 805 correspond to K light beams in the light grid.

The function of system signals Clk 706, Reset 707, Eclk 708, Sclk 709, and Pload 710 may operate as described with respect to photo-detector assembly 700 in FIG. 7. System clock 706 is generated by clock generator 802, which may also be used to provide a clock signal to controller 804. Controller 804 controls the shift registers (e.g., shift register 711 for each of the photo-detector assemblies 801 through 805) via the signals Reset 707, Eclk 708, Sclk 709, and/or Pload 710. Controller 804 determines when the counters in the photo-detector assemblies 801 through 805 are reset, e.g., by activating Reset 707 at the beginning of each detection cycle during operation. Controller 804 also determines when the shift registers (e.g., shift registers 711) are enabled by activating the clock signals Eclk 708, Eclk K 806, etc. Controller 804 also loads the shift registers (e.g., shift registers 711) with the count at the end of each detection cycle of operation by activating Pload 710. In addition, controller 804 converts the binary count, representing the amount of time a given light beam was blocked, to a serial bit stream by activating shift clock Sclk 709.

Shift clock Sclk 709 may be a derivative of system clock 802. For example controller 804 may convert the signal from system clock 802 to a lower frequency to be used as the signal for shift clock 709.

Once a given measurement is taken, outputs 810 to 807 of each shift register (e.g., shift register 711) of the K photo-detection assemblies 801 to 805 are sent to communications interface 604. Controller 804 may sequentially select which photo-detector assembly output is sent to communications interface 604 by means of a set of Select signals 607.

In an embodiment, communications interface 604 comprises a set of electronics that converts or formats the serial data 810 to 807 from all of the shift registers into a package of information that is compatible with the communications protocol that is used to transmit output 808. The protocol used to transmit output 808 can be for a parallel, serial, or wireless communication. For example, output 808 may be transmitted over a wired or wireless Ethernet connection to a local or remote server.

Figure 9:
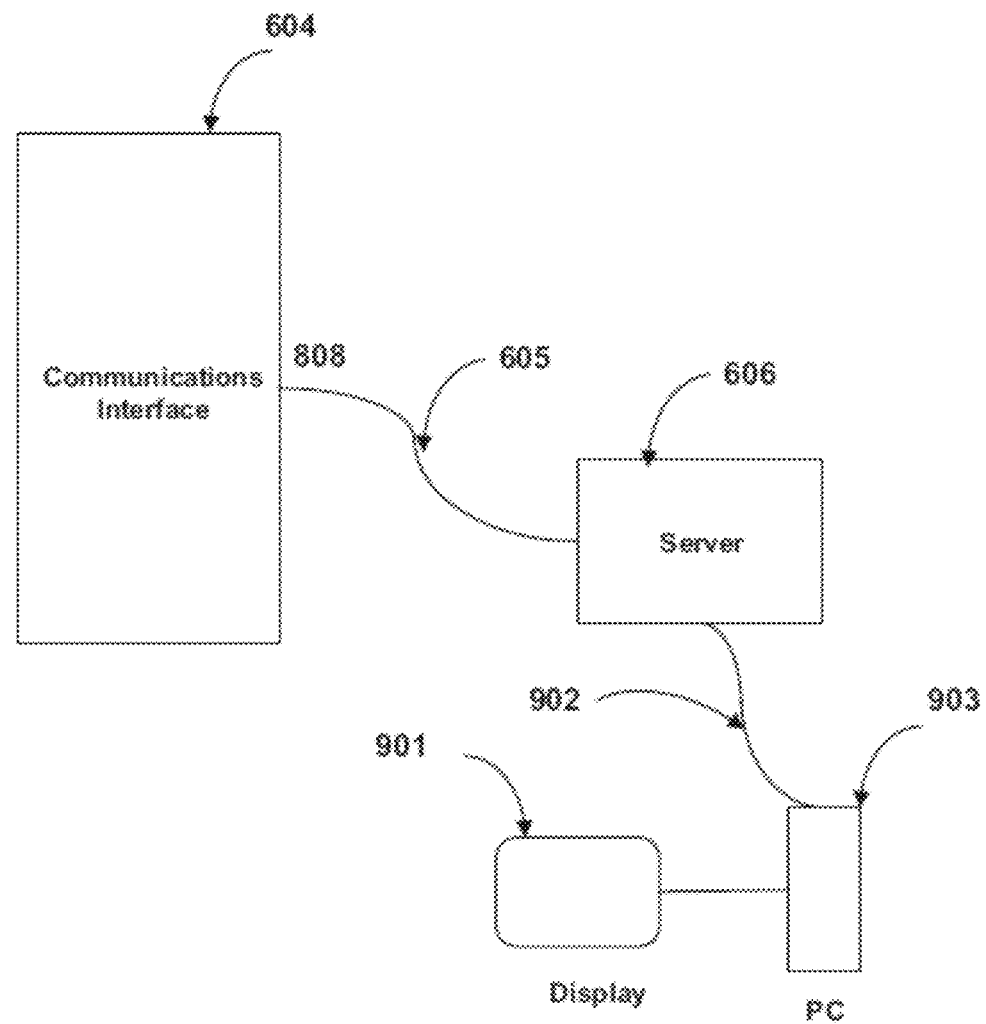
FIG. 9 illustrates a data-transmission configuration for a detection system, according to an embodiment.

FIG. 9 illustrates a data-transmission configuration for a grid detection system, according to an embodiment. In the illustrated example, communications interface 604 provides an output 808 to an Ethernet connection 605 with a remote server 606. Alternatively, server 606 may be local (e.g., integrated into structure 100). Server 606 may store the output 808 as detection information in a database. The detection information stored in the database may be accessed through a communications port 902, for example, by a personal computer 903 (e.g., desktop and/or laptop computer) or other device (e.g., mobile device). Device 903 can have a display 901 which is used to present detection information about the detected object (e.g., a sports object) to the user in one or more graphical user interfaces. The graphical user interface(s) may be generated by server 606 or by a client application executing on device 903, based, at least in part, on the detection information stored in the database.

Figure 10:
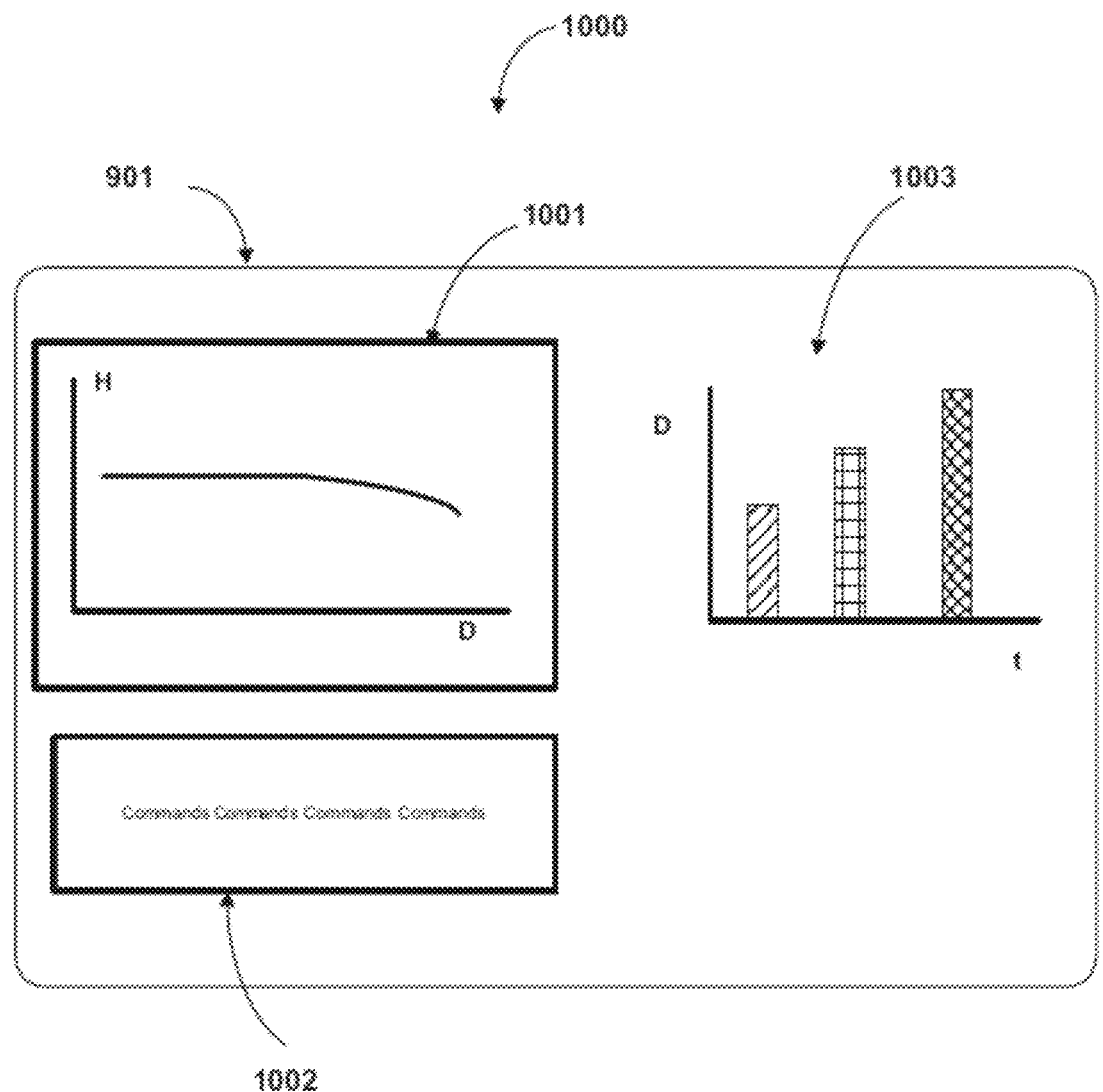
FIG. 10 illustrates an example graphical user interface for conveying motion characteristics of a detected object to a user, according to an embodiment.

FIG. 10 illustrates one example graphical user interface 1000 which may be rendered on display 901, according to an embodiment. As shown, the user interface may illustrate a plot 1001 of the trajectory of the detected object, may present a menu of commands 1002 that can be used to control the entire detection system, parts of the detection system, and/or aspects of the user interface(s), and/or may provide graph(s) 1003 which can present statistical information regarding the performance of a given athlete.

Figure 11:
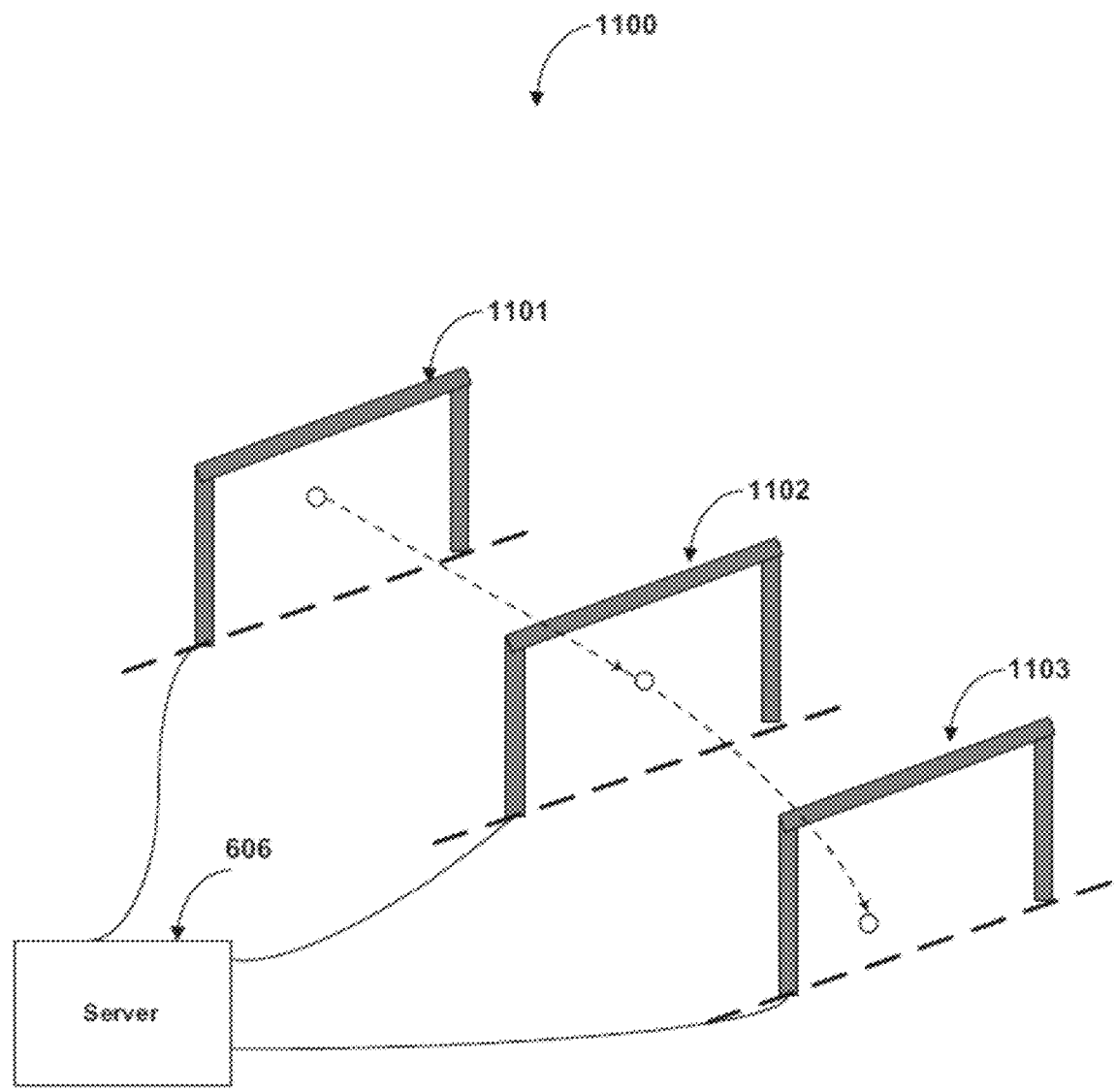
FIG. 11 illustrates a multi-grid configuration comprising a plurality of light grid structures, according to an embodiment.

FIG. 11 illustrates a multi-grid configuration 1100, according to an embodiment. As shown, the system comprises three grids 1101, 1102, and 1103. Each grid may be identical to each other and to grid 100 described with respect to FIG. 1, and may include any of the components described elsewhere herein. Accordingly, each of grids 1101, 1102, and 1103 may produce a set of data which is routed through its respective communications interface (e.g., communications interface 604) to server 606 (which may be remote in the illustrated embodiment). The set of data from each of grids 1101, 1102, and 1103 may be processed by one or more algorithms (e.g., that implement the detection process) executing at server 606 or on a device (e.g., device 903) communicatively connected to server 606. The algorithm(s) may determine the trajectory of the detected object. For example, in the case that the object is a baseball, the multiple grid configuration illustrated in FIG. 11 can be used to determine the trajectory of a curveball (e.g., including rotation and/or sideways movement of the baseball).

It should be understood that modifications may be made to the system described herein. For example, instead of a circular-front laser beam, the optics used to collimate and direct the laser beam may be designed to shape the laser beam as a thin sheet of larger width. In such an embodiment, detection could be made when a portion of the sheet is blocked. This design would require detection of the laser power received at the photo-detector, rather than simply detecting whether or not the laser beam is blocked or not blocked. Such an approach may reduce the number of lasers used to detect the object and reduce alignment requirements.

2. Processes

Embodiments of processes which may be implemented in the disclosed system, including the detection process described elsewhere herein, will now be described in detail. It should be understood that the described processes may be embodied as algorithms in one or more software modules that are executed by one or more hardware processors (e.g., by the server discussed above and/or in the manner described below with respect to the system 1700). The described processes may implemented as instructions represented in source code, object code, and/or machine code. These instructions may be executed directly by the hardware processor(s), or alternatively, may be executed by a virtual machine operating between the object code and the hardware processors. Alternatively, the described processes may be implemented entirely in hardware, or as a combination of software and hardware. In addition, the implemented processes may be built upon or interfaced with one or more existing systems.

2.1. Overview

In an embodiment, the system implements a set of algorithms in software that calculate the speed and trajectory of an object passing through the light grid, based on information collected (e.g., by the data serializer) from the photo-detector assemblies. This set of algorithms may be implemented as software stored and executed on the server discussed elsewhere herein or on another processing device that is local (e.g., housed in or on the window frame of the apparatus(es)) or remote (e.g., connected to the apparatus(es) via wired or wireless connection) to the apparatus(es) described herein. The set of algorithms may use trigonometric calculations and various equations, discussed in more detail below, to derive motion characteristics (e.g., location, trajectory, and/or speed) of an object passing through the light grid based on the pattern of obstructed light beams, as determined based on the photo-detector assembly outputs of the apparatus(es). These motion characteristics may be determined whenever an object passes through the grid in one direction, whenever an object passes through the grid in either direction, and/or whenever an object passes through the grid in one direction and then subsequently passed through the grid in the opposite direction, depending on the particular design goals of the system.

In an embodiment, the system also implements a set of digital tools that may be used to analyze and display the data collected by the apparatus and stored and/or data derived from the collected data. This set of digital tools may be implemented as software stored and executed on the server discussed elsewhere herein or on another processing device that is local (e.g., housed in or on the window frame of the apparatus(es)) or remote (e.g., connected to the apparatus(es) via wired or wireless connection) to the apparatus(es) described herein. Alternatively or additionally, the set of digital tools may be executed on an external system, such as on a personal computer or mobile device which downloads the set of digital tools from the server or an application store. In the case that the set of digital tools is downloaded and executed on an external system, such as a personal computer or mobile device, the external system may communicate with the server (e.g., wirelessly or via a wired connection) directly or indirectly (e.g., via a network such as the Internet) to download information related to a particular set of information (e.g., a set of data collected during a particular training session and/or information derived from analyzing the collected data).

The set of digital tools may comprise algorithms that calculate the speed and trajectory of an object in three-dimensional space based on the data collected by the apparatus(es) (e.g., the particular light beams that are obstructed). In addition, the digital tools may render one or more user interfaces that comprise the results of a given test. Such results may comprise statistical information regarding a particular athlete's performance during the test, graphics illustrating the speed and/or trajectory of a detected object, and other information used to evaluate performance. Statistical information may include, without limitation, speed, trajectory, and/or location, for example, with respect to a fictional or actual fixed object. For instance, in the context of baseball, the fixed object may be the home plate. The location of a home plate to be used as the fixed object may be inferred from the positioning of the apparatus(es) and/or the athlete, or the apparatus(es) may be positioned with respect to an actual home plate (e.g., in a batting cage). In either case, the location of the fixed object to be used as a relative basis for the location of the moving object detected by the apparatus(es) may be a setting or input to the apparatus(es), the server, and/or the digital tools.

The statistical information may include the trajectory and/or speed of an object crossing the light grid in two opposing directions. This may be especially useful in sports applications such as baseball, since a baseball may pass through the light grid in one direction after a pitch and then return through the light grid in the opposite direction after being hit by a batter. The user interfaces may present the results plotted against an implied field of play (e.g., generated and rendered based on the set location of the fixed object with respect to the apparatus). In the baseball example, the return trajectory may be plotted against a baseball field to show the trajectory of the baseball, the distance traveled by the baseball (e.g., derived based at least in part on speed and trajectory), and/or the end location of the baseball (e.g., derived based at least in part on speed and trajectory). The displayed information can indicate, or be used to determine, whether the batted baseball was a ground ball, a line drive, a fly ball, a homerun, etc.

In one embodiment, a plurality of apparatuses may be placed in an actual field of play or an apparatus may comprise a plurality of light grids along a path that the object to be detected is expected to travel. Data may be collected from each of the apparatuses or for each of the light grids to determine information about the object which is useful to evaluate performance. In the baseball context, the information can be used to determine how a baseball curves near the batter, along with the decrease in speed and acceleration of the baseball along its trajectory after it is pitched and/or hit. As an example, such information could be used to determine the effectiveness of a pitcher in throwing a curveball pitch.

2.2. Detailed Detection Process

In an embodiment, the system implements the detection process discussed throughout the present disclosure as follows:

(1) collect light beam break times;
(2) calculate total time each light beam is broken;
(3) calculate chord ratio (R) for each grid;
(4) calculate mean chord (Q) for each grid;
(5) calculate angle of incidence ($\Theta$) based on R and Q;
(6) calculate object position (d1);
(7) calculate object velocity (v); and
(8) locate object position in terms of entire system;

Each of these steps will now be described in detail.

2.2.1. Collect Light Beams

First, break times are collected. Depending on the number of light beams (e.g., laser beams) broken or interrupted at each light grid structure (e.g., each structure 100) and the number of light grid structures used (e.g., two or three), the number of timestamps passed to the server or other processing device may be between twenty-four and thirty-six. In an embodiment, when three beams in a single direction on a single light grid structure are interrupted by the object, the shortest beam path (i.e., the interruption with the shortest duration) is dropped from the computation, thereby leaving two break durations for each interruption in each direction on each light grid structure.

The following table describes the naming convention used herein for breaks at each light grid structure for a system that utilizes three separate light grid structures having horizontal and vertical light beams and which drops the shortest beam path in each direction on each light grid structure, thereby producing twenty-four total timestamps (e.g., measured in milliseconds):

| Grid Name | Beam Direction | Laser Break Times |
|---|---|---|
| 1V | Vertical | t1, t2, t3, t4 |
| 1H | Horizontal | t5, t6, t7, t8 |
| 2V | Vertical | t9, t10, t11, t12 |
| 2H | Horizontal | t13, t14, t15, t16 |
| 3V | Vertical | t17, t18, t19, t20 |
| 3H | Horizontal | t21, t22, t23, t24 |

Each set of four timestamps for each light grid structure may be processed together to determine the position, velocity, and/or angle of an object (e.g., baseball) detected by each light grid structure. The naming convention used herein (1V, 3H, etc.) is defined such that the number describes the grid plane being crossed by the object, with the lower number (e.g., "1") being nearer the initial starting position of the object (e.g., nearer the pitching mound in the context of baseball) and the higher number (e.g., "3") being further from the initial starting position of the object (e.g., nearer home plate in the context of baseball). The letter in the naming convention describes the direction of the light beam (e.g., vertical or horizontal in the described embodiments).

In embodiments which utilize vertical and horizontal light beams, the vertical light beams can be used to calculate the lateral position of the detected object, and the horizontal beams can be used to calculate the height of the detected object.

2.2.2. Calculate Duration of Break

The time duration over which each light beam is continuously broken is calculated as follows:

$\Delta T1 = t2 - t1$;

$\Delta T2 = t4 - t3$;

$\Delta T3 = t6 - t5;$ $\Delta T4 = t8 - t7;$ $\Delta T5 = t10 - t9;$ $\Delta T6 = t12 - t11;$ $\Delta T7 = t14 - t13;$ $\Delta T8 = t16 - t15;$ $\Delta T9 = t18 - t17;$ $\Delta T10 = t20 - t19;$ $\Delta T11 = t22 - t21;$ $\Delta T12 = t24 - t23.$ 2.2.3. Calculate Chord Ratio The chord ratio (R) is calculated for each light grid structure and direction as follows:

$R_{1V} = \Delta T1 / \Delta T2;$ $R_{1V} = \Delta T3 / \Delta T4;$ $R_{2V} = \Delta T5 / \Delta T6;$ $R_{2H} = \Delta T7 / \Delta T8;$ $R_{3V} = \Delta T9 / \Delta T10;$ $R_{3H} = \Delta T11 / \Delta T12.$ 2.2.4. Calculate Mean Chord The mean chord (Q) is calculated for each light grid structure and direction as follows:

$Q_{1V} = (t1 + t3)/(t2 + t4);$ $Q_{1H} = (t5 + t7)/(t6 + t8);$ $Q_{2V} = (t9 + t11)/(t10 + t12);$ $Q_{2H} = (t13 + t15)/(t14 + t16);$ $Q_{3V} = (t17 + t19)/(t18 + t20);$ $Q_{3H} = (t21 + t23)/(t22 + t24).$ 2.2.5. Calculate Theta The calculation of the angle of incidence (Θ) provides the first piece of information regarding the trajectory of the object (e.g., flight of a ball). Specifically, Θ is the angle of the trajectory that the object is traveling across the plane of the light grid. The following fourth-order polynomial equations may be used to describe the relationship between Q (from Section 2.2.4) and Θ:

$\Theta_{1V} = AQ_{1V}^4 + BQ_{1V}^3 + CQ_{1V}^2 + DQ_{1V} + E;$ $\Theta_{1H} = AQ_{1H}^4 + BQ_{1H}^3 + CQ_{1H}^2 + DQ_{1H} + E;$ $\Theta_{2V} = AQ_{2V}^4 + BQ_{2V}^3 + CQ_{2V}^2 + DQ_{2V} + E;$ $\Theta_{2H} = AQ_{2H}^4 + BQ_{2H}^3 + CQ_{2H}^2 + DQ_{2H} + E;$ $\Theta_{3V} = AQ_{3V}^4 + BQ_{3V}^3 + CQ_{3V}^2 + DQ_{3V} + E;$ $\Theta_{3H} = AQ_{3H}^4 + BQ_{3H}^3 + CQ_{3H}^2 + DQ_{3H} + E.$ The coefficients A, B, C, D, and E can be found using a lookup table in which values depend on the value of R (from Section 2.2.3) and/or one or more relevant timestamps. If R does not exactly match one of the values listed in the lookup table, then it may be rounded to the nearest value in the lookup table. This may constitute a source of error, but this rounding effect can be mitigated by producing coefficients for a large number of different R values (e.g., three-hundred-ninety-nine different R values, according to an embodiment).

As an example, the table below provides the first ten lines of coefficients (i.e., for ten different R values), according to an embodiment:

| | | if t1 ≤ t3 | | | | | if t1 > t3 | | | | |
|---|---|---|---|---|---|---|---|---|---|---|---|
| # | R | A | B | C | D | E | A | B | C | D | E |
| 1 | 0.4467 | 0 | 0 | 0 | 0 | 0 | 3558.9361 | −963.1682 | 227.3668 | 205.4760 | −37.2236 |
| 2 | 0.4494 | 0 | 0 | 0 | 0 | 0 | 3575.2259 | −959.2646 | 226.0989 | 205.8070 | −37.0320 |
| 3 | 0.4522 | 0 | 0 | 0 | 0 | 0 | 3571.4130 | −940.6091 | 221.1004 | 206.5465 | −36.8486 |
| 4 | 0.4550 | 0 | 0 | 0 | 0 | 0 | 3594.3057 | −939.6371 | 220.4363 | 206.8259 | −36.6477 |
| 5 | 0.4578 | 0 | 0 | 0 | 0 | 0 | 3584.3887 | −917.7552 | 214.9325 | 207.5928 | −36.4650 |
| 6 | 0.4606 | 0 | 0 | 0 | 0 | 0 | 3593.0416 | −907.5309 | 212.1686 | 208.0770 | −36.2717 |
| 7 | 0.4633 | 0 | 0 | 0 | 0 | 0 | 3614.8559 | −906.0945 | 211.4473 | 208.3524 | −36.0787 |
| 8 | 0.4661 | 0 | 0 | 0 | 0 | 0 | 3607.7778 | −885.2490 | 206.1586 | 209.0945 | −35.8952 |
| 9 | 0.4689 | 0 | 0 | 0 | 0 | 0 | 3591.2920 | −860.4511 | 200.4507 | 209.8317 | −35.7101 |
| 10 | 0.4717 | 0 | 0 | 0 | 0 | 0 | 3628.9091 | −866.7704 | 201.2657 | 209.9834 | −35.5063 |

For example, if R=0.455 and t1>t3, then A, B, C, D, and E are determined to be, via the lookup table, 3594.3057, −939.6371, 220.4363, 206.8259, and −36.6477, respectively. Thus, the equation would be: $\Theta = 3594.3057 \, Q^4 - 939.6371 \, Q^3 + 220.4363 \, Q^2 + 206.8259 \, Q - 36.6477$. The value of Θ may be calculated in degrees.

In an embodiment, one characteristic of the lookup table is that one set of coefficients (A through E) is used when t1 is less than or equal to t3, and another set of coefficients (A through E) is used when t1 is greater than t3. In other words, referring to FIG. 4, the detection process determines whether location 401 of the object breaks grid plane 411 first or location 405 of the object breaks grid plane 411 first. If location 401 of the object breaks grid plane 411 first, timestamp t1 will be less than timestamp t3. Otherwise, if location 405 of the object breaks grid plane 411 first, timestamp t1 will be greater than timestamp t3. If locations 401 and 405 of the object break grid plane 411 simultaneously, timestamps t1 and t3 will be equal.

For certain values of R—particularly those at the low and high ends of the range for R—the coefficients for one of the two datasets (i.e., A-E for t1≤t3 or A-E for t1>t3) may all be zero. For example, as illustrated in the table above, the coefficients A-E for the first ten values of R, when t1≤t3, are all zero. This reflects the fact that, when R is between 0.4467 and 0.4717, t1 is never less than or equal to t3. In this case, location 405 of the object (represented by timestamp t3) will always break the plane of the light grid before location 401 of the object (represented by timestamp t1).

It should be understood that the table above merely illustrates a portion of a full lookup table for the vertical light beams of a single grid structure. The full lookup table would also comprise coefficient values for additional values of R for the vertical light beams, and coefficient values for values of R for the horizontal light beams split into two sets for t5≤t7 and t5>t7. Alternatively, the lookup table may be identical for both the vertical light beams and horizontal light beams, with coefficient values split into two sets based on the relationship between a first initial interruption timestamp (e.g., t1, t5, etc.) for one light beam and a second initial interruption timestamp (e.g., t3, t7, etc.) for an adjacent light beam. For example, in this case, a first set of coefficients may be used if the first timestamp is less than or equal to the second timestamp and a second set of coefficients may be used if the first timestamp is greater than the second timestamp.

It should also be understood that identical or different lookup tables may be used for each light grid structure in the system. If different lookup tables are used for each light grid structure, the different lookup tables may be combined into a single lookup table for ease of use. On the other hand, if identical lookup tables are used for each light grid structure, only one copy of the lookup table may be stored, and this copy may be consulted multiple times to determine coefficient values for each light grid structure.

2.2.6. Calculate Object Position

The calculation of the position of the object (d1) provides for the position of the center of the object with respect to one of the two light beams through which the object passes. In the following example, the units of d1 are in inches. However, other units of measure may be used. In an embodiment:

if $R=1$, then $d1=-0.0001\Theta^2+0.6498$, where $\Theta$ is in degrees; and if $R\neq 1$, then $d1=(LR^2 \cos \Theta - \sqrt{r^2-2r^2R^2+r^2R^4+L^2R^2(\cos\Theta)^2})/(R^2-1)$, where $\Theta$ is in radians, L=distance between adjacent beams (e.g., 1.3 inches if the object to be detected is a baseball), r=nominal object radius (e.g., 1.453 inches in the case of a baseball), and R and $\Theta$ are determined according to Section 2.2.5. It should be understood that L and r in the above equation should be set according to the particular object or objects to be detected, such that r is equal to the radius of the smallest object to be detected and L (which represents the spacing between adjacent light beams) is less than r.

To convert $\Theta$ from degrees to radians, the detection process may utilize the following conversion: degrees×($\pi$ radians/180 degrees)=radians.

2.2.7. Calculate Object Velocity

To calculate the velocity of the object being detected, firstly, the grid plane distance "a" from the center of the object to chord 1 is calculated, as follows:

$$a_{1V}=d1_{1V}/\cos(\Theta_{1V});$$

$$a_{1H}=d1_{1H}/\cos(\Theta_{1H});$$

$$a_{2V}=d1_{2V}/\cos(\Theta_{2V});$$

$$a_{2H}=d1_{2H}/\cos(\Theta_{2H});$$

$$a_{3V}=d1_{3V}/\cos(\Theta_{3V});$$

$$a_{3H}=d1_{3H}/\cos(\Theta_{3H}).$$

In this case, the units of "a" are inches, $\Theta$ is calculated according to Section 2.2.5, and d1 is calculated according to Section 2.2.6.

The length of chord 1 c1 is calculated as follows:

$$c1_{1V}=2\sqrt{r^2-d1_{1V}^2};$$

$$c1_{1H}=2\sqrt{r^2-d1_{1H}^2};$$

$$c1_{2V}=2\sqrt{r^2-d1_{2V}^2};$$

$$c1_{2H}=2\sqrt{r^2-d1_{2H}^2};$$

$$c1_{3V}=2\sqrt{r^2-d1_{3V}^2};$$

$$c1_{3H}=2\sqrt{r^2-d1_{3H}^2}.$$

In this case, the units of c1 are inches, r=nominal object radius (e.g., 1.453 inches in the case of a baseball), and d1 is calculated according to Section 2.2.6.

Next, the velocity V is calculated as follows:

$$V_{1V}=c1_{1V}/\Delta T1;$$

$$V_{1H}=c1_{1H}/\Delta T3;$$

$$V_{2V}=c1_{2V}/\Delta T5;$$

$$V_{2H}=c1_{2H}/\Delta T7;$$

$$V_{3V}=c1_{3V}/\Delta T9;$$

$$V_{3H}=c1_{3H}/\Delta T11.$$

In this case, $\Delta T$ is calculated according to Section 2.2.2.

To convert velocity from inches per millisecond (in/ms) to miles per hour (mph), the detection process may utilize the following conversion: in/ms×1000 ms/1 s×60 s/1 min×60 min/1 hr×1 m/63360 in=mph.

2.2.8. Locate Object Position within System

Figure 12:
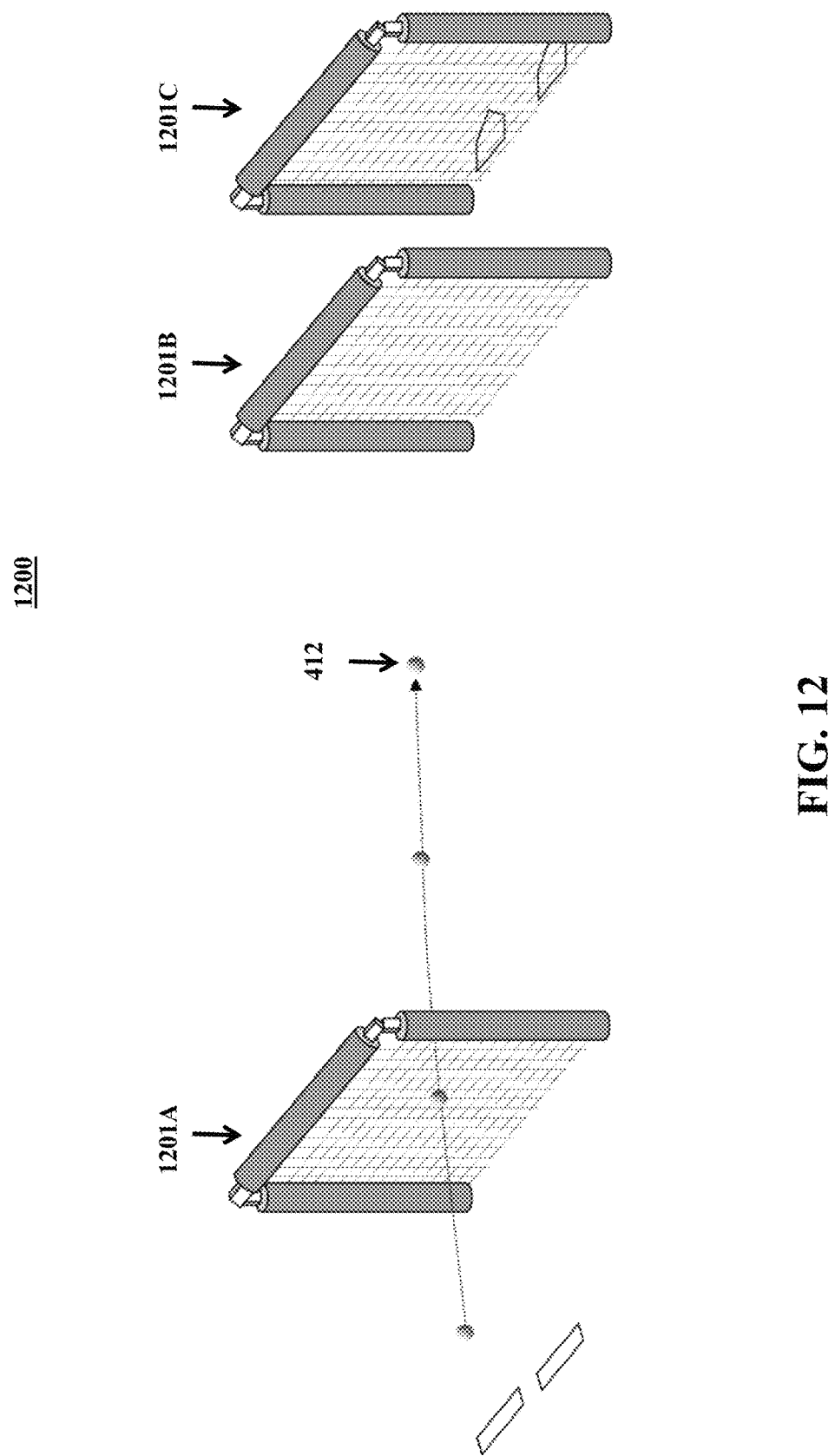
FIG. 12 illustrates a multi-grid configuration comprising a plurality of light grid structures, according to an embodiment.

The position of the detected object calculated in Section 2.2.7 is in terms of the center of the object and the chord 1 light beam breaking across the object. To determine the position of the detected object within the entire system (e.g., with respect to an implied playing field), the relative horizontal or vertical location of each beam is identified and any known error or offset of the grid is incorporated. For instance, in a detection system with one or more light grid structures (e.g., the detection system 1200 in FIG. 12 with light grids structures 1201A-C), the position of each light grid may be known relative to one or more fixed positions representing aspects of a playing field. As illustrated in FIG. 12, in the context of baseball, the light grid structure(s) may be positioned between a pitching mark representing a pitching mound and a plate representing home plate. The distance between the pitching mark and home plate may represent the actual distance between the pitching mound and home plate on a baseball field. Thus, if the positions of the light grid structure(s) are known relative to the pitching mark and/or home plate, the position(s) of a baseball thrown through the light grid structure(s) can also be determined relative to the pitching mark and/or home plate. Specifically, the position of the baseball is the same as the position of each light grid structure at the time the baseball is detected crossing the plane of the light grid of that light grid structure. Alternatively or additionally, further position(s) relative to the light grid structure(s) may be interpolated based on the known position(s) of the baseball, obtained from the light grid structure(s), and motion characteristics obtained for the baseball. These position(s), relative to the pitching mark and/or home plate in a training environment, can then be mapped or superimposed (e.g., using a virtual representation of a baseball, line or arrow, points, etc.) onto a virtual representation of a playing field such that they are relative to a virtual pitching mound and/or virtual home plate within the virtual representation of the playing field.

3. Example Embodiment

One example embodiment of a detection system will now be described. FIG. 12 illustrates a system 1200, comprising three light grid structures 1201A, 1201B, and 1201C. These light grid structures may be identical, similar, or different to the structures 1101, 1102, and 1103 in FIG. 11, and the structure 100 in FIG. 1, and may individually or in combination comprise the various components and implement the various processes disclosed throughout the present description. In addition, alternative embodiments of system 1200 may comprise fewer or more than three light grid structures. The light grids may be composed of laser light beams or other types of light beams (e.g., LED light beams).

As illustrated, each light grid structure 1201A-C generates a light grid comprising a plurality of horizontal and vertical light beams. However, it should be understood that in alternative embodiments, the light grids may comprise more, fewer, or different light beams and light-beam directions (e.g., diagonal beams at a 45° angle or other angle).

System 1200 will be described with respect to a baseball and in the context of baseball. However, it should be understood that any object (e.g., football, soccer ball, golf ball, hockey puck, person, etc.) may be substituted for the baseball and the context may be appropriately changed with minor (or no) adjustments to the components and/or values described herein.

As shown in FIG. 12, while in flight, a pitched baseball will travel through all three structures 1201A-C. Each structure 1201A-C will collect data as the baseball passes through its respective light grid. Each structure 1201A-C may transmit its collected data to a central processing device (e.g., server) for analysis. The data collected by system 1200 as the baseball breaks the light grids are analyzed to determine the trajectory of the pitched baseball (e.g., location, angle, speed, etc.).

Figure 13:
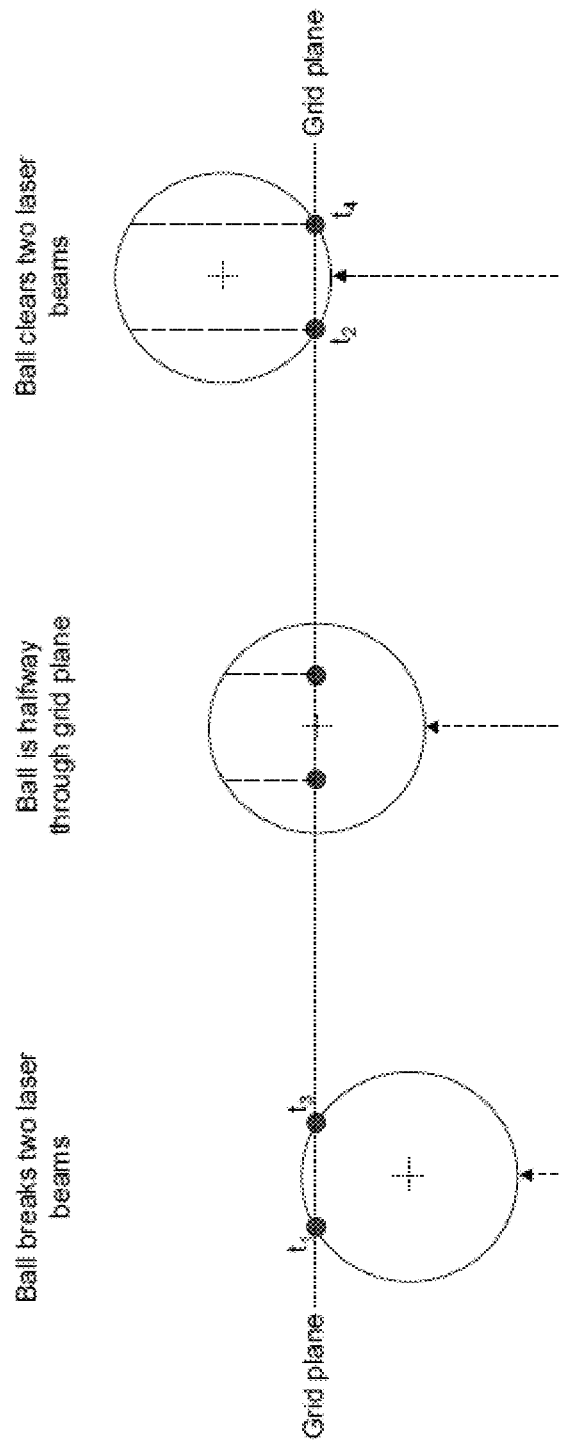
FIG. 13 illustrates how a ball passes through two light beams in a light grid, according to an example.

FIG. 13 illustrates how the baseball passes through two light beams of a grid plane of a single light grid structure, according to an example. As the ball passes through each grid plane, at least two light beams in each direction (e.g., horizontal and vertical) are temporarily broken or interrupted. These interruptions create discrete timestamps t1, t2, t3, and t4, which were described in detail above. The timestamps are used to determine the location, angle of incidence, and/or speed of the ball as it passes through the grid, for example, according to the detection process described in Section 2.2. In the illustrated example, as the ball passes through the grid plane, the center of the ball passes midway between two beams.

Figure 14A:
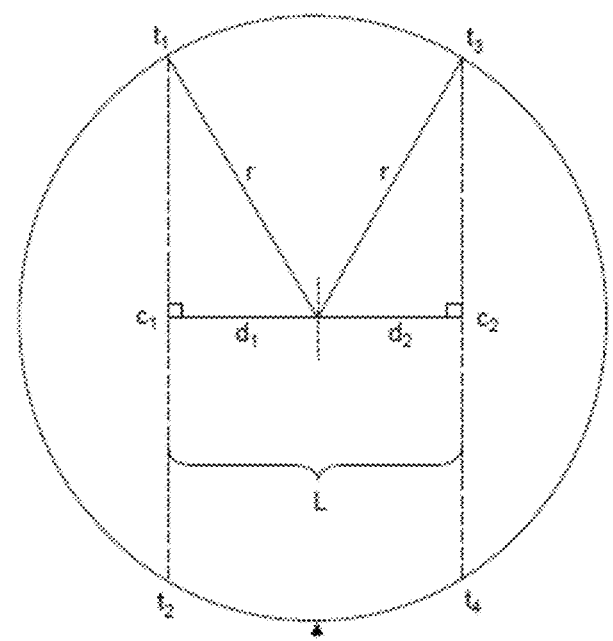
FIGS. 14A-14C illustrate various values used to calculate the motion characteristics of an object, according to an embodiment.

FIG. 14A illustrates an example in which the incident angle of the ball is zero degrees and the ball is centered between two light beams. In this example:
 r is the nominal radius of the ball, which is 1.453 inches in the case of a baseball;
 L is the spacing between light beams (e.g., laser beams);
 V is the velocity of the ball;
 $d_1$ is the distance from the center of the ball to chord 1 (normal to chord 1), defined as the chord between the initial location on the ball which interrupts the first light beam (i.e., the left light beam in the illustrated example) and the final location on the ball which interrupts the first light beam;
 $d_2$ is the distance from the center of the ball to chord 2 (normal to chord 2), defined as the chord between the initial location on the ball which interrupts the second light beam (i.e., the right light beam, which is adjacent to the first light beam, in the illustrated example) and the final location on the ball which interrupts the second light beam;
 c1 is the length of chord 1, which is equal to $2\sqrt{r^2-d_1^2}$;
 c2 is the length of chord 2, which is equal to $2\sqrt{r^2-d_2^2}$;
 $\Delta T1$ is the total time that the first light beam is blocked, which is equal to t2−t1;
 $\Delta T2$ is the total time that the second light beam is blocked, which is equal to t4−t3; and
 R is the chord ratio, which is equal to $\Delta T1/\Delta T2$.

Figure 14B:
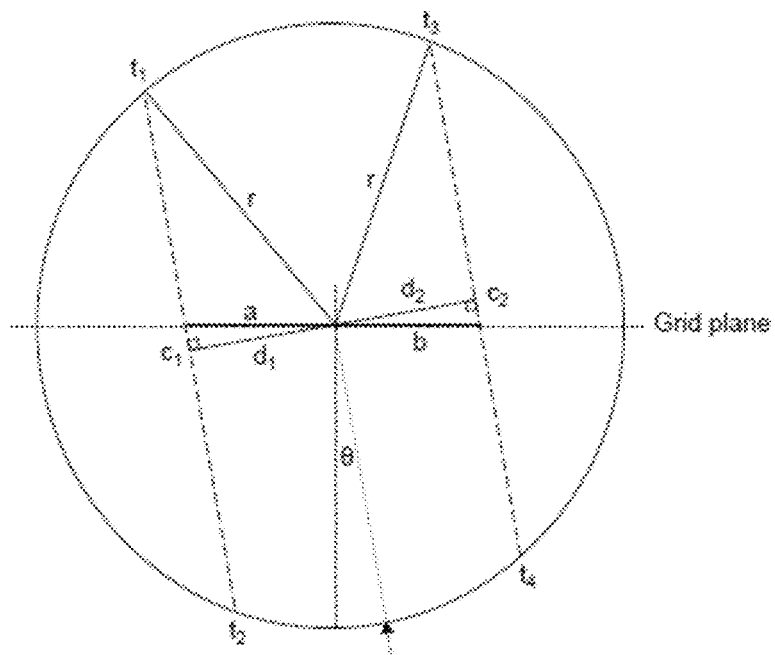

FIG. 14B illustrates an example in which the incident angle of the ball is not zero degrees and the ball is centered between two light beams. In this example:
 a is the distance along the grid plane from the center of the ball to chord 1;
 b is the distance along the grid plane from the center of the ball to chord 2; and
 $\Theta$ is the incident angle.

If $\Theta=0°$, then $a=d_1$ and $b=d_2$. On the other hand, if $\Theta \neq 0°$, then:
 $\cos \Theta = d_1/a$;
 $\cos \Theta = d_2/b$; and
 $L=a+b$.

Substituting for a and b, the equation becomes:

$$L = d1/\cos\Theta + d2/\cos\Theta.$$

Therefore, $L \times \cos \Theta = d_1+d_2$.

Assuming that velocity V is constant while the ball passes through the light grid, distance=velocity×time. Therefore, $c_1=V \times \Delta T1$, and $c_2=V \times \Delta T2$. Accordingly:

$$c1/c2 = (V \times \Delta T1)/(V \times \Delta T2) = \Delta T1/\Delta T2.$$

Substituting, $$R = \Delta T1/\Delta T2 = c1/c2 = \frac{\sqrt[2]{r^2 - d_1^2}}{\sqrt[2]{r^2 - d_2^2}} = \frac{\sqrt{r^2 - d_1^2}}{\sqrt{r^2 - d_2^2}}.$$

Substituting for d2:

$$R = \sqrt{\frac{r^2 - d_1^2}{r^2 - (L \times \cos\Theta - d_1)^2}} \quad \text{Equation 1}$$

R, r, and L are known, while $\Theta$ and $d_1$ are unknown at this point. Before solving for $d_1$, $\Theta$ should first be determined.

Figure 14C:
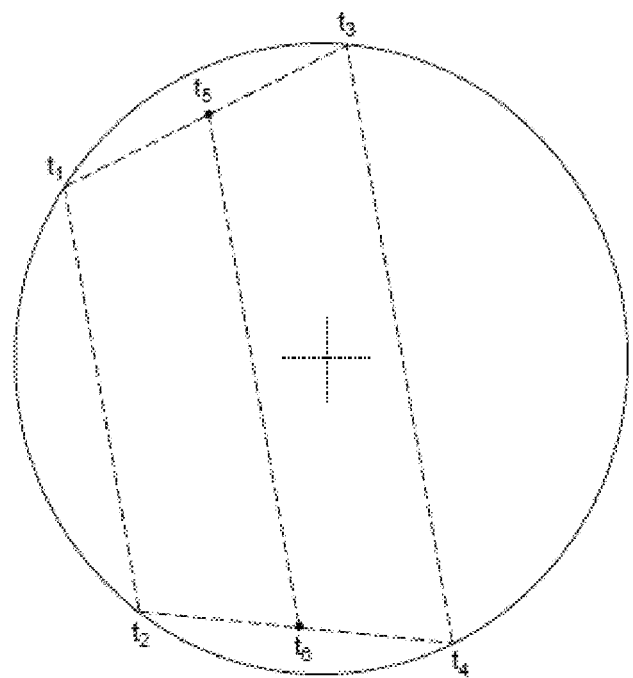

FIG. 14C illustrates an example in which the incident angle of the ball is not zero degrees and the center of the ball is closer to one light beam than the other light beam. In this example:
 t5 is equal to (t1+t3)/2, representing the initial timestamp of the mean chord defined as the chord between the midpoint of a first chord, between the initial location on the ball which interrupts the first light beam and the initial location on the ball which interrupts the second light beam, and the midpoint of a second chord, between the final location on the ball which interrupts the first light beam and the final location on the ball which interrupts the second light beam;

t6 is equal to (t2+t4)/2, representing the final timestamp of the mean chord; and Q is a unit-less characteristic related to the mean chord and defined as t5/t6.

It is hypothesized that, for an infinite number of positions and angles (e.g., pitch positions and angles), Q is directly related to the angle of incidence (e.g., angle of the pitch).

Figure 15:
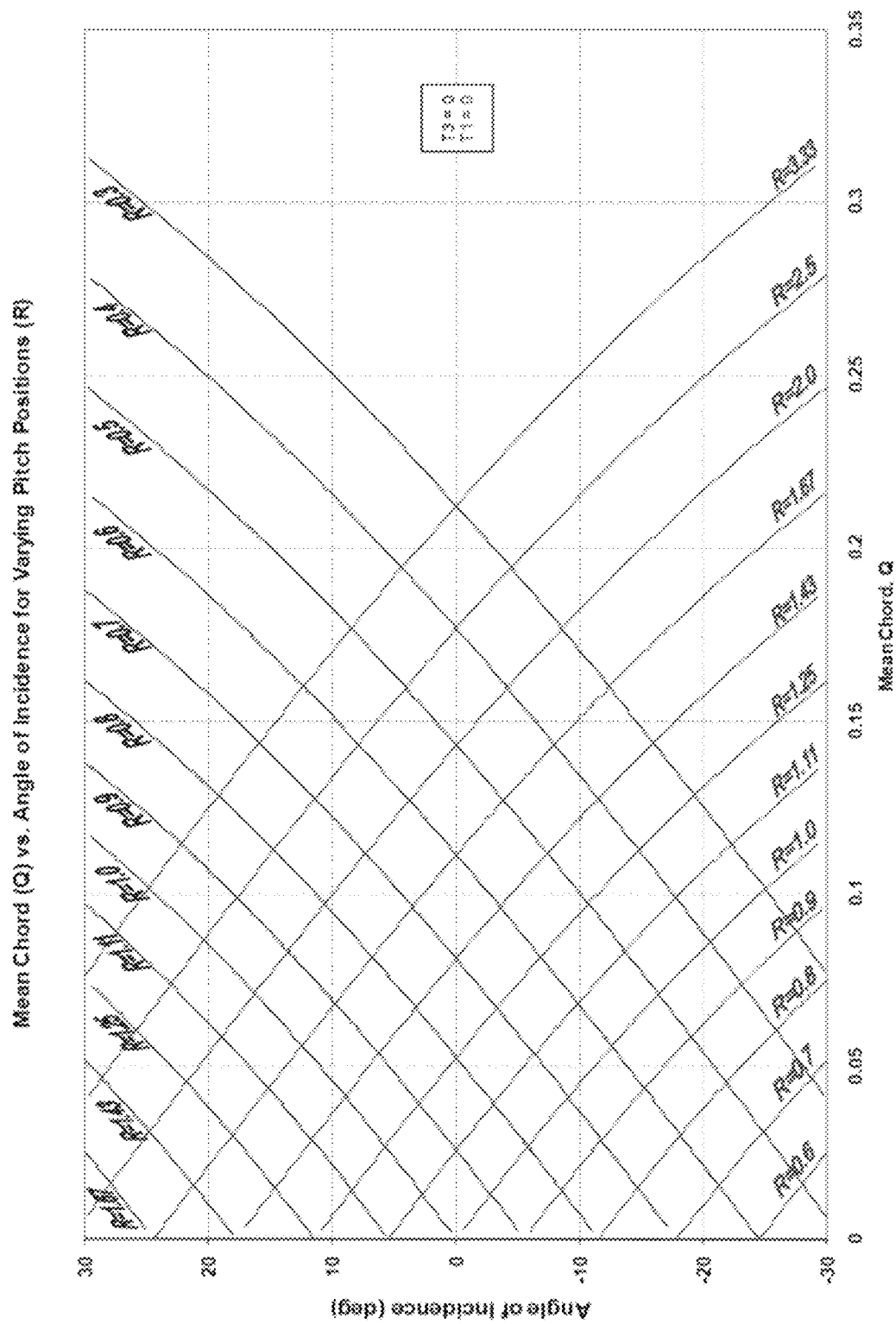
FIG. 15 illustrates the relationship between a defined ratio for an object and an angle of incidence of the object, according to an example.

FIG. 15 plots the relationship between Q and $\Theta$. This plot uses fixed values of R (i.e., 0.3, 0.4, 0.5, . . . 2.0, 2.5, 3.33). The curves rising from left to right (T3=0) are created when t3 is the earliest timestamp (i.e., t3<t1), representing that the object interrupts the second light beam first. The curves falling from left to right (T1=0) are created when t1 is the earliest timestamp (i.e., t1≤t3), representing that the object interrupts the first light beam first. For known Q and R values, the angle of incidence may be determined from these curves, i.e., as a function of Q and R. For example, the angle of incidence can be determined using a lookup table indexed by Q and R or using a simple function that relates Q and R to an angle of incidence.

However, it should be understood that, given that there an infinite number of possible R values, not all R values will fall perfectly on one of the finite curves. In other words, a lookup table or function based on these curves will not be able to provide an exact angle of incidence $\Theta$ for every value of R. One option is to round to the nearest curve (e.g., to the nearest R value) to determine an approximate angle of incidence $\Theta$. Alternatively, other rounding methods may be used.

Rounding introduces a level of error into the calculations of the angle of incidence $\Theta$. However, this error can be mitigated by increasing the number of R values provided for in the lookup table or function. For example, in addition to the twenty-four curves shown in FIG. 15, three-hundred-fifty-two additional curves may be determined, so that the error caused by rounding is negligible. It should be understood that more or fewer curves (i.e., relationships between Q and R and the angle of incidence $\Theta$) may be defined in the lookup table or function, depending on the level of error deemed to be tolerable for a particular application.

Once $\Theta$ is determined (e.g., using a lookup or function based on Q and R), d1 can be determined using Equation 1. Specifically, the solution for d1 is:

$$d1 = \frac{LR^2\cos\Theta - \sqrt{r^2 - 2r^2R^2 + r^2R^4 + L^2R^2\cos\Theta^2}}{R^2 - 1} \quad \text{Equation 2}$$

Figure 16:
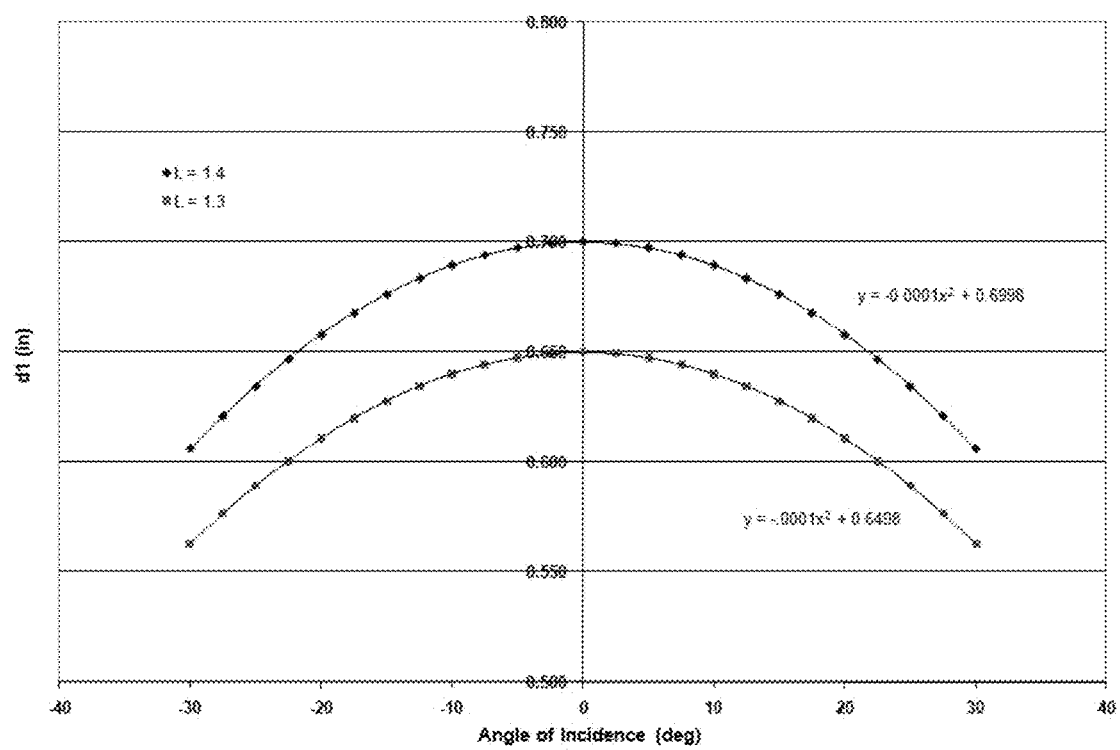
FIG. 16 illustrates the relationship between a distance within an object and an angle of incidence of the object, according to an example.

Notably, when R=1, the denominator in Equation 2 becomes zero, rendering Equation 2 unsolvable. However, the value of d1 as R approaches 1 can be derived. FIG. 16 illustrates an example plot of d1 versus $\Theta$, when R=1 and r=1.453. The plot contains results for both L=1.3 and L=1.4. In the case of L=1.3, a second-order polynomial curve can be fit to the data to get d1=−0.0001×$\Theta^2$+0.6498. In the case of L=1.4, the curve is defined as d1=−0.0001×$\Theta^2$+0.6998.

Using this approach, d1 can be determined. Once d1 is determined, the position of the baseball relative to home plate (or the position of another object relative to a fixed position within the system) can be determined based on which light beams were interrupted by the path of the ball.

In addition, the velocity of the ball can be calculated by determining the value of c1 according to:

$$c1 = 2\sqrt{r^2 - d_1^2},$$

and then determining the value of velocity V according to:

$$V = c1/\Delta T1.$$

In summary, the position (a), velocity (V), and angle of incidence ($\Theta$) can be calculated for the trajectory of the ball passing through one or more light grids (e.g., composed of laser light beams in multiple directions). Thus, a trajectory vector can be computed.

5. Additional Features

The disclosed system provides cutting-edge technology, which can be used for training, recruitment, recreation, etc. As discussed herein, the system is able to determine velocity, distance, and location of an object. For example, in the context of baseball, the system can determine off-the-bat velocity, distance, and location of the baseball. The system can then plot the trajectory of the object relative to a virtual field. For example, in the context of baseball, the system could plot the trajectory of the baseball overlaid on or inset into a virtual image of a baseball field, along with statistics and other graphical features. It should be understood that some positions along the trajectory of the detected object can be interpolated based on known positions (i.e., the position of the ball as it passes through one or more light grids).

In an embodiment, the system may comprise image and/or video capture (including high-resolution image or video capture). For example, the system may record video of an athlete hitting or throwing the object to be detected. This video may be rendered for display in one or more user interfaces in slow motion (e.g., to review swing or throwing mechanics). Each image or video capture can be associated with its corresponding object (i.e., the object that was detected immediately following the swing, throw, etc.). This enables instant review of best and worst practices.

In an embodiment, the trajectory, speed, and/or position of the detected object may be translated into a two or three-dimensional graphical representation. For example, a baseball hit may be plotted on a three-dimensional graphical representation of a baseball field, a football throw may be plotted on a three-dimensional graphical representation of a football field, a golf stroke may be plotted on a three-dimensional graphical representation of a golf course, and so on. In addition, multiple hits or throws in a single training session may be plotted on the same two or three-dimensional graphical representation. The multiple hits or throws may also be distinguished (e.g., by reference numerals, colors, or other marks or indications) so that a user may review the entire training session and select or navigate through data for each hit or throw made during the training session.

In an embodiment used for baseball, data collected from the system may include, without limitation, distance and trajectory of a hit or throw, spray chart, hit velocity, pitch velocity, pitch location, and the like. Such an embodiment may provide an athlete with highly accurate, subjective feedback, identify a hitter's "sweet spot" for pitches, provide exit speed and hit quality, capture an athlete's entire history to help identify trends, provide pre-programmed workouts, provide session reviews and player trends, provide instant access to historical data for an athlete or athletes, provide gaming modes configured to train players for situational hitting, rate an athlete's bat speeds and/or slugging power, etc.

In an embodiment, a light grid structure may span multiple throwing or hitting "channels" or lanes and be capable of detecting and differentiating between objects traversing its light grid within each channel. For example, in the baseball context, there may be two hitting and/or pitching channels. For instance, as illustrated in FIG. 12, there may be two pitching marks and two home plates offset from each other along a horizontal axis with respect to the plane of the light grid. Thus, two athletes may throw or hit a ball at the same time, and motion characters for both balls may be determined using the same light grid structure(s) in the same system.

Each ball or other object can be distinguished from each other based on the position at which they interrupt the light grid of each light grid structure. For example, if one object interrupts a light grid near the left side of the light grid (e.g., offset from the center towards the left side or from the left side toward the center within a predetermined tolerance), it can be determined that the object is in the left-most channel, whereas if the object interrupts the same light grid near the right side of the light grid (e.g., offset from the center towards the right side or from the right side towards the center within a predetermined tolerance), it can be determined that the object is in the right-most channel. Thus, the object in the left-most channel can be differentiated from the right-most channel, and the motion characteristic and statistics for each ball can be distinguished so as to form separate reports (e.g., for simultaneous training sessions by two different athletes). It should be understood that any number of channels are possible (e.g, one, two, three, four, ten, twenty, etc.), and is only limited by the width or span of the light grid structure(s) and the desired application. For example, a light grid structure designed for a golf application could be constructed to have a wide span capable of twenty different channels, so that twenty different individuals can each practice their golf hits at the same time.

4. Example Processing Device

Figure 17:
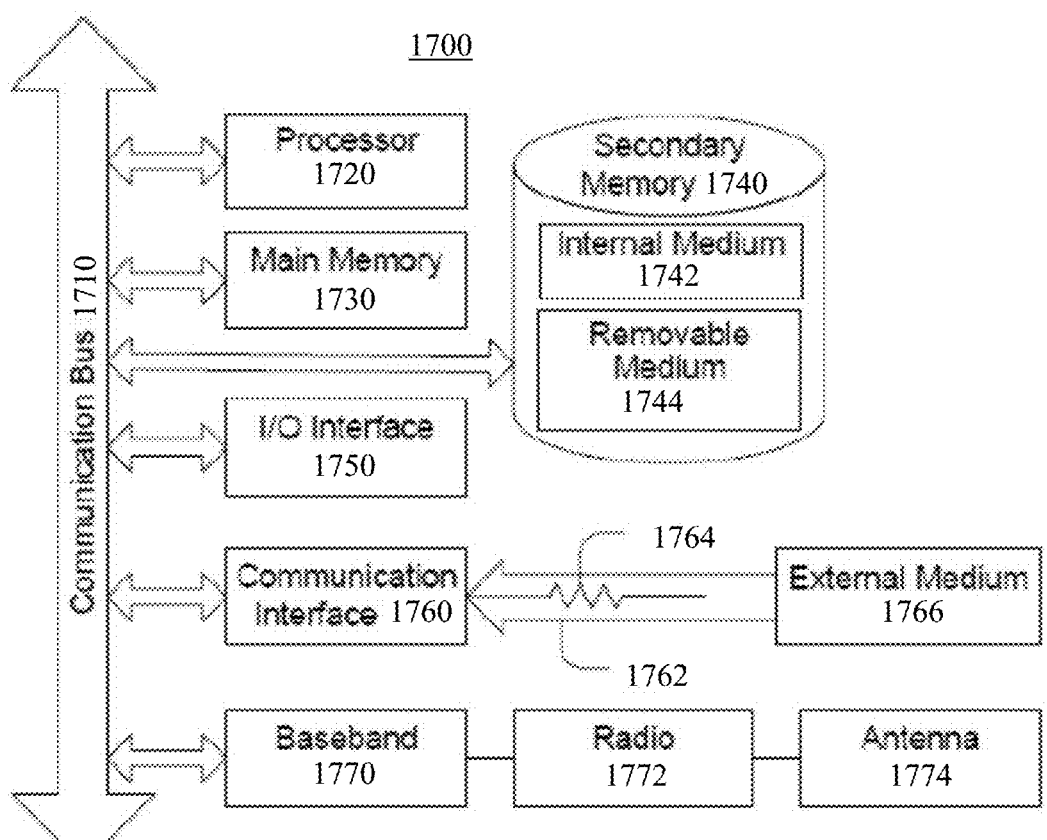
FIG. 17 illustrates a processing system on which one or more of the processes described herein may be executed, according to an embodiment.

FIG. 17 is a block diagram illustrating an example wired or wireless system 1700 that may be used in connection with various embodiments described herein. For example the system 1700 may be used as or in conjunction with one or more of the mechanisms, processes, algorithms, methods, or functions described above, and may represent components of the apparatus, server, and/or any of the other devices described herein. The system 1700 can be a server or any conventional personal computer, or any other processor-enabled device that is capable of wired or wireless data communication. Other computer systems and/or architectures may be also used, as will be clear to those skilled in the art.

The system 1700 preferably includes one or more processors, such as processor 1720. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1720. Examples of processors which may be used with system 1700 include, without limitation, the Pentium® processor, Core i7® processor, and Xeon® processor, all of which are available from Intel Corporation of Santa Clara, Calif.

The processor 1720 is preferably connected to a communication bus 1710. The communication bus 1710 may include a data channel for facilitating information transfer between storage and other peripheral components of the system 1700. The communication bus 1710 further may provide a set of signals used for communication with the processor 1720, including a data bus, address bus, and control bus (not shown). The communication bus 1710 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 1700 preferably includes a main memory 1730 and may also include a secondary memory 1740. The main memory 1730 provides storage of instructions and data for programs executing on the processor 1720, such as one or more of the functions and/or modules discussed above. It should be understood that programs stored in the memory and executed by processor 1720 may be written and/or compiled according to any suitable language, including without limitation C/C++, Java, JavaScript, Perl, Visual Basic, .NET, and the like. The main memory 1730 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 1740 may optionally include an internal memory 1742 and/or a removable medium 1744, for example a floppy disk drive, a magnetic tape drive, a compact disc (CD) drive, a digital versatile disc (DVD) drive, other optical drive, a flash memory drive, etc. The removable medium 1744 is read from and/or written to in a well-known manner.

The removable storage medium 1744 is a non-transitory computer-readable medium having stored thereon computer executable code (i.e., software) and/or data. The computer software or data stored on the removable storage medium 1744 is read into the system 1700 for execution by the processor 1720.

In alternative embodiments, secondary memory 1740 may include other similar means for allowing computer programs or other data or instructions to be loaded into the system 1700. Such means may include, for example, an external storage medium 1766 and an interface 1760. Examples of external storage medium 1766 may include an external hard disk drive or an external optical drive, or and external magneto-optical drive.

Other examples of secondary memory 1740 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 1744 and communication interface 1760, which allow software and data to be transferred from an external medium 1766 to the system 1700.

System 1700 may include a communication interface 1760. The communication interface 1760 allows software and data to be transferred between system 1700 and external devices (e.g. printers), networks, or information sources. For example, computer software or executable code may be transferred to system 1700 from a network server via communication interface 1760. Examples of communication interface 1760 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 1700 with a network or another computing device.

Communication interface 1760 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 1760 are generally in the form of electrical communication signals 1764. These signals 1764 are preferably provided to communication interface 1760 via a communication channel 1762. In one embodiment, the communication channel 1762 may be a wired or wireless network, or any variety of other communication links. Communication channel 1762 carries signals 1764 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software, such as the disclosed application) is stored in the main memory 1730 and/or the secondary memory 1740. Computer programs can also be received via communication interface 1760 and stored in the main memory 1730 and/or the secondary memory 1740. Such computer programs, when executed, enable the system 1700 to perform the various functions of the present invention as previously described.

In this description, the term "computer readable medium" is used to refer to any non-transitory computer readable storage media used to provide computer executable code (e.g., software and computer programs) to the system 1700. Examples of these media include main memory 1730, secondary memory 1740 (including internal memory 1742, removable medium 1744, and external storage medium 1766), and any peripheral device communicatively coupled with communication interface 1760 (including a network information server or other network device). These non-transitory computer readable mediums are means for providing executable code, programming instructions, and software to the system 1700.

In an embodiment that is implemented using software, the software may be stored on a computer readable medium and loaded into the system 1700 by way of removable medium 1744, I/O interface 1750, or communication interface 1760. In such an embodiment, the software is loaded into the system 1700 in the form of electrical communication signals 1764. The software, when executed by the processor 1720, preferably causes the processor 1720 to perform the inventive features and functions previously described herein.

In an embodiment, I/O interface 1750 provides an interface between one or more components of system 1700 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 1700 also includes optional wireless communication components that facilitate wireless communication over a voice and over a data network. The wireless communication components comprise an antenna system 1774, a radio system 1772 and a baseband system 1770. In the system 1700, radio frequency (RF) signals are transmitted and received over the air by the antenna system 1774 under the management of the radio system 1772.

In one embodiment, the antenna system 1774 may comprise one or more antennae and one or more multiplexers (not shown) that perform a switching function to provide the antenna system 1774 with transmit and receive signal paths. In the receive path, received RF signals can be coupled from a multiplexor to a low noise amplifier (not shown) that amplifies the received RF signal and sends the amplified signal to the radio system 1772.

In alternative embodiments, the radio system 1772 may comprise one or more radios that are configured to communicate over various frequencies. In one embodiment, the radio system 1772 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 1772 to the baseband system 1770.

If the received signal contains audio information, then baseband system 1770 decodes the signal and converts it to an analog signal. Then the signal is amplified and sent to a speaker. The baseband system 1770 also receives analog audio signals from a microphone. These analog audio signals are converted to digital signals and encoded by the baseband system 1770. The baseband system 1770 also codes the digital signals for transmission and generates a baseband transmit audio signal that is routed to the modulator portion of the radio system 1772. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 1774 where the signal is switched to the antenna port for transmission.

The baseband system 1770 is also communicatively coupled with the processor 1720. The central processing unit 1720 has access to data storage areas 1730 and 1740. The central processing unit 1720 is preferably configured to execute instructions (i.e., computer programs or software) that can be stored in the memory 1730 or the secondary memory 1740. Computer programs can also be received from the baseband processor 1774 and stored in the data storage area 1730 or in secondary memory 1740, or executed upon receipt. Such computer programs, when executed, enable the system 1700 to perform the various functions of the present invention as previously described. For example, data storage areas 1730 and/or 1740 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system comprising:
a light grid structure comprising a frame, a plurality of light-source assemblies, and a plurality of photo-detector assemblies, wherein each of the plurality of light-source assemblies and the plurality of photo-detector assemblies is mounted on the frame such that each one of the plurality of light-source assemblies is on an opposite side of the frame than a corresponding one of the plurality of photo-detector assemblies, wherein each of the plurality of light-source assemblies emits a light beam which is detected by its corresponding photo-detector assembly, and wherein each of the plurality of photo-detector assemblies comprises
a photo-detector which produces a current in response to receiving light from a corresponding one of the plurality of light-source assemblies,
an amplifier which converts the current from the photo-detector into a voltage,
a comparator which provides an enablement signal when the voltage from the amplifier is greater than a threshold voltage,
a counter which outputs a count based on the enablement signal from the comparator, wherein the count is a binary count and indicates an amount of time that the light from the corresponding light-source assembly was interrupted, and
a shift register which receives the binary count output by the counter, and converts the binary count into a serial output; and
at least one processor that
receives data that is based on outputs of the plurality of photo-detector assemblies, wherein the data indicates two or more light beams which have been interrupted and a time duration over which each of the two or more light beams has been continuously interrupted, and,
based on the data, determines one or more motion characteristics of an object which interrupted the two or more light beams, wherein the one or more motion characteristics comprise an angle of incidence calculated based on the time durations over which the two or more light beams had been continuously interrupted.

2. The system of claim 1, further comprising at least one interface configured to receive outputs from each of the plurality of photo-detector assemblies, and transmit the data that is based on the outputs to the at least one processor.

3. The system of claim 2, wherein the at least one interface formats the outputs from the each of the plurality of photo-detector assemblies into a digital word, and transmits the digital word as the data.

4. The system of claim 1, wherein the at least one processor is mounted on or within the light grid structure.

5. The system of claim 1, further comprising a controller which controls the counter and shift register for each of the plurality of photo-detector assemblies.

6. The system of claim 1, wherein each of the plurality of photo-detector assemblies comprises a single circuit board, and wherein the photo-detector, the amplifier, the comparator, the counter, and the shift register are all integrated into the single circuit board.

7. The system of claim 1, wherein the light beam emitted by each of the plurality of light-source assemblies is a laser light beam, and wherein each of the plurality of light-source assemblies comprises a laser diode.

8. The system of claim 1, wherein the plurality of light-source assemblies mounted on any one side of the frame are equally spaced from each other according to a radius of the object.

9. The system of claim 8, wherein the spacing is less than a radius of the object.

10. The system of claim 8, wherein the plurality of light-source assemblies and the plurality of photo-detector assemblies are arranged to form a light grid comprising light beams in at least two different directions.

11. The system of claim 10, wherein the two different directions comprise a horizontal direction and a vertical direction, such that the light grid comprises horizontal light beams and vertical light beams.

12. The system of claim 11, wherein the horizontal light beams and the vertical light beams are in a same plane.

13. The system of claim 8, wherein determining one or more motion characteristics of the object comprises, for each of at least two directions, determining the angle of incidence by:
   based on the data, determining at least two light beams that have been interrupted, wherein the data comprises a first start timestamp indicating a start of the interruption of a first one of the at least two light beams, a first end timestamp indicating an end of the interruption of the first light beam, a second start timestamp indicating a start of the interruption of a second one of the at least two light beams, and a second end timestamp indicating an end of the interruption of the second light beam;
   calculating a first duration for which the first light beam was interrupted based on the first start timestamp and the first end timestamp;
   calculating a second duration for which the second light beam was interrupted based on the second start timestamp and the second end timestamp;
   calculating a chord ratio of the first duration to the second duration;
   calculating a mean chord based on the first start timestamp, the first end timestamp, the second start timestamp, and the second end timestamp; and
   determining the angle of incidence of the object with respect to a plane of the light grid based on the chord ratio and the mean chord.

14. The system of claim 13, wherein determining one or more motion characteristics of the object further comprises, for each of the at least two directions, determining a distance between a center of the object and at least one of the first light beam and the second light beam based, at least in part, on the determined angle of incidence.

15. The system of claim 14, wherein determining a distance between the center of the object and the at least one light beam comprises:
   when the chord ratio is equal to one, determining the distance between the center of the object and the at least one light beam based, at least in part, on the determined angle of incidence and a constant value; and,
   when the chord ratio is not equal to one, determining the distance between the center of the object and the at least one light beam based, at least in part, on the determined angle of incidence, the chord ratio, the spacing between the plurality of light-source assemblies, and a radius of the object.

16. The system of claim 14, wherein determining one or more motion characteristics of the object comprises, for each of the at least two directions, determining a velocity of the object by:
   calculating a length of a chord, defined by a start position on the object that interrupts the first light beam at a time represented by the first start timestamp and an end position on the object that interrupts the first light beam at a time represented by the first end timestamp, based, at least in part, on the distance between the center of the object and the at least one light beam; and
   calculating the velocity of the object based on the length of the chord and the first duration.

17. The system of claim 16, wherein the at least one processor further:
   determines a position of the object relative to a virtual field of play based, at least in part, on the one or more motion characteristics; and
   generates an image comprising a representation of the object at the position within a representation of the virtual field of play.

18. The system of claim 1, comprising a plurality of light grid structures, wherein the at least one processor receives data that is based on outputs of the plurality of photo-detector assemblies from each of the plurality of light grid structures.

* * * * *